(12) United States Patent
Mangharam et al.

(10) Patent No.: US 11,429,118 B2
(45) Date of Patent: Aug. 30, 2022

(54) CONTROL OF MULTI-DRONE FLEETS WITH TEMPORAL LOGIC OBJECTIVES

(71) Applicant: The Trustees of the University of Pennsylvania, Philadelphia, PA (US)

(72) Inventors: Rahul Mangharam, Philadelphia, PA (US); Yash Vardhan Pant, Philadelphia, PA (US); Houssam Abbas, Philadelphia, PA (US); Rhudii A. Quaye, Philadelphia, PA (US)

(73) Assignee: THE TRUSTEES OF THE UNIVERSITY OF PENNSYLVANIA, Philadelphia, PA (US)

( * ) Notice: Subject to any disclaimer, the term of this patent is extended or adjusted under 35 U.S.C. 154(b) by 134 days.

(21) Appl. No.: 16/515,854

(22) Filed: Jul. 18, 2019

(65) Prior Publication Data
US 2020/0348696 A1 Nov. 5, 2020

Related U.S. Application Data

(60) Provisional application No. 62/699,933, filed on Jul. 18, 2018.

(51) Int. Cl.
*G05D 1/10* (2006.01)
*G08G 5/00* (2006.01)
*G08G 5/04* (2006.01)

(52) U.S. Cl.
CPC .......... *G05D 1/104* (2013.01); *G05D 1/1064* (2019.05); *G08G 5/003* (2013.01); *G08G 5/04* (2013.01)

(58) Field of Classification Search
CPC ...... G05D 1/104; G05D 1/1064; G05D 1/106; G08G 5/003; G08G 5/04; G08G 5/0013; G08G 5/0034; G08G 5/0043; G08G 5/006; G08G 5/0069; G08G 5/0082; G08G 5/045
See application file for complete search history.

(56) References Cited

PUBLICATIONS

Alqahtani; Sarra et al., MTL Robustness for Path Planning with A*, Jul. 15, 2018 (Year: 2018).*
Abbas; Houssam et al., Functional Gradient Descent Method for Metric Temporal Logic Specifications, Jun. 2014 (Year: 2014).*

(Continued)

*Primary Examiner* — Aniss Chad
*Assistant Examiner* — Chase L Cooley
(74) *Attorney, Agent, or Firm* — Jenkins, Wilson, Taylor & Hunt, P.A.

(57) ABSTRACT

Methods, systems, and computer readable media for controlling a fleet of drones. A method includes receiving a mission specification for each drone of one or more drones, each mission specification including spatio-temporal requirements for the drone. The method includes generating, for each drone, a low-rate trajectory for the drone by performing a robustness maximization of satisfying the mission specification over a low-rate sequence of waypoints for the drone based on a mapping between low-rate trajectories and high-rate trajectories. The method includes transmitting, to each drone, the low-rate trajectory for the drone, causing a local controller of each drone to control the drone by generating a high-rate trajectory using the low-rate trajectory and the mapping between low-rate trajectories and high-rate trajectories.

21 Claims, 11 Drawing Sheets

(56) References Cited

PUBLICATIONS

Mueller; Mark et al., A Computationally Efficient Motion Primitive for Quadrocopter Trajectory Generation, Dec. 2015 (Year: 2015).*
Raman; Vasumathi et al., Model Predictive Control with Signal Temporal Logic Specifications, Dec. 2014 (Year: 2014).*
Yongbo; Chen et al., Trajectory Optimization of Multiple Quadrotor UAVs in Collaborative Assembling Task, Dec. 2015 (Year: 2015).*
Ma; Xiaobai et al., Decentralized Prioritized Motion Planning for Multiple Autonomous UAVs in 3D Polygonal Obstacle Environments, Jun. 2016 (Year: 2016).*
Pant et al., "Smooth Operator: Control using the Smooth Robustness of Temporal Logic," IEEE Conference on Control Technology and Applications, pp. 1-10 (2017).
Saha et al., "An MILP Approach for Real-Time Optimal Controller Synthesis with Metric Temporal Logic Specifications," arXiv:1603.02650v1, pp. 1-11 (Mar. 8, 2016).
Saha et al., "Automated Composition of Motion Primitives for Mutli-Robot Systems from Safe LTL Specifications," IROS, pp. 1-8 (2014).
Razaviyayn et al., "Parallel Successive Convex Approximation for Nonsmooth Nonconvex Optimization," Industrial and Manufacturing Systems Engineering Conference Proceedings and Posters, vol. 46, pp. 1-10 (2014).
Pant et al., "Fly-by-Logic: Control of Multi-Drone Fleets with Temporal Logic Objectives," pp. 1-14 (Mar. 19, 2018).
Wongpiromsarn et al., "Receding Horizon Temporal Logic Planning," TAC 2012, pp. 1-14 (2011).
Farahani et al., "Robust Model for Predictive Control for Signal Temporal Logic Synthesis" IFAC-PapersOnLine, pp. 1-6 (2015).
Yoo et al., "Control with Probabilistic Signal Temporal Logic," ArXiv arXiv:1510.08474v1 [cs.SY], pp. 1-7, (Oct. 2015).
Raman et al., "Reactive Synthesis from Signal Temporal Logic Specifications," HSCC'15 Proceedings of the 18th International Conference on Hybrid Systems: Computation and Control, pp. 1-9 (2015).
Duarte, "Multi-UAV Mission Coordination using Signal Temporal Logic Specifications," Thesis form Tecnio Lisboa, pp. 1-62 (Sep. 2016).
Fainekos et al., "Robustness of temporal logic specifications for continuous-time signals," Theoretical Computer Science, vol. 410, pp. 1-30 (2009).

* cited by examiner

CONTROL OF MULTI-DRONE FLEETS WITH TEMPORAL LOGIC OBJECTIVES

RELATED APPLICATIONS

This application claims the benefit of U.S. Provisional Patent Application Ser. No. 62/699,933, filed Jul. 18, 2018, the disclosure of which is incorporated herein by reference in its entirety.

GOVERNMENT INTEREST

This invention was made with government support under Grant No. 130-1304-4-566568-XXXX-2000-0140 awarded by the U.S. Department of Transportation. The government has certain rights in the invention.

TECHNICAL FIELD

This specification relates generally to drone control and more particularly to controlling multi-drone fleets with temporal logic objectives

BACKGROUND

As the technology behind autonomous systems is starting to mature, they are being envisioned to perform greater variety of tasks. Drone missions can have complex spatial requirements, temporal requirements, and reactive requirements. The safe planning and control of multi-agent systems for missions like these is becoming an area of utmost importance. Most existing work for this either lacks the expressiveness to capture such requirements, relies on simplifying abstractions that result in conservative behavior, or do not take into account explicit timing constraints. In addition to these limitations, many of the planning methods are computationally intractable (and hence do not scale well or work in real-time) and provide guarantees only on a simplified abstraction of the system behavior.

SUMMARY

This specification describes methods, systems, and computer readable media for controlling a fleet of drones. A method includes receiving a mission specification for each drone of the fleet of drones, each mission specification including spatio-temporal requirements for the drone. The method includes generating, for each drone, a low-rate trajectory for the drone by performing a robustness maximization of satisfying the mission specification over a low-rate sequence of waypoints for the drone based on a mapping between low-rate trajectories and high-rate trajectories. The method includes transmitting, to each drone, the low-rate trajectory for the drone, causing a local controller of each drone to control the drone by generating a high-rate trajectory using the low-rate trajectory and the mapping between low-rate trajectories and high-rate trajectories.

The subject matter described herein may be implemented in hardware, software, firmware, or any combination thereof. As such, the terms "function" or "node" as used herein refer to hardware, which may also include software and/or firmware components, for implementing the feature(s) being described. In some exemplary implementations, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

The problem of safe planning and control for multidrone systems across a variety of missions is of critical importance, as the scope of tasks assigned to such systems increases. This specification presents an approach to solve this problem for multi-quadrotor missions and other drone missions. Given a mission expressed in Signal Temporal Logic (STL) or other appropriate syntax, a controller maximizes robustness to generate trajectories for the quadrotors that satisfy the STL specification in continuous-time. The constraints on the optimization guarantee that these trajectories can be tracked nearly perfectly by the drones, e.g., using lower level off-the-shelf position and attitude controllers. The approach avoids the oversimplifying abstractions found in many planning methods, while retaining the expressiveness of missions encoded in STL allowing handling of complex spatial, temporal and reactive requirements.

This specification describes methods, systems, and computer readable media for controlling a fleet of drones. The methods, systems, and computer readable media are described with reference to a paper that is described below.

I. INTRODUCTION

Figure 1:
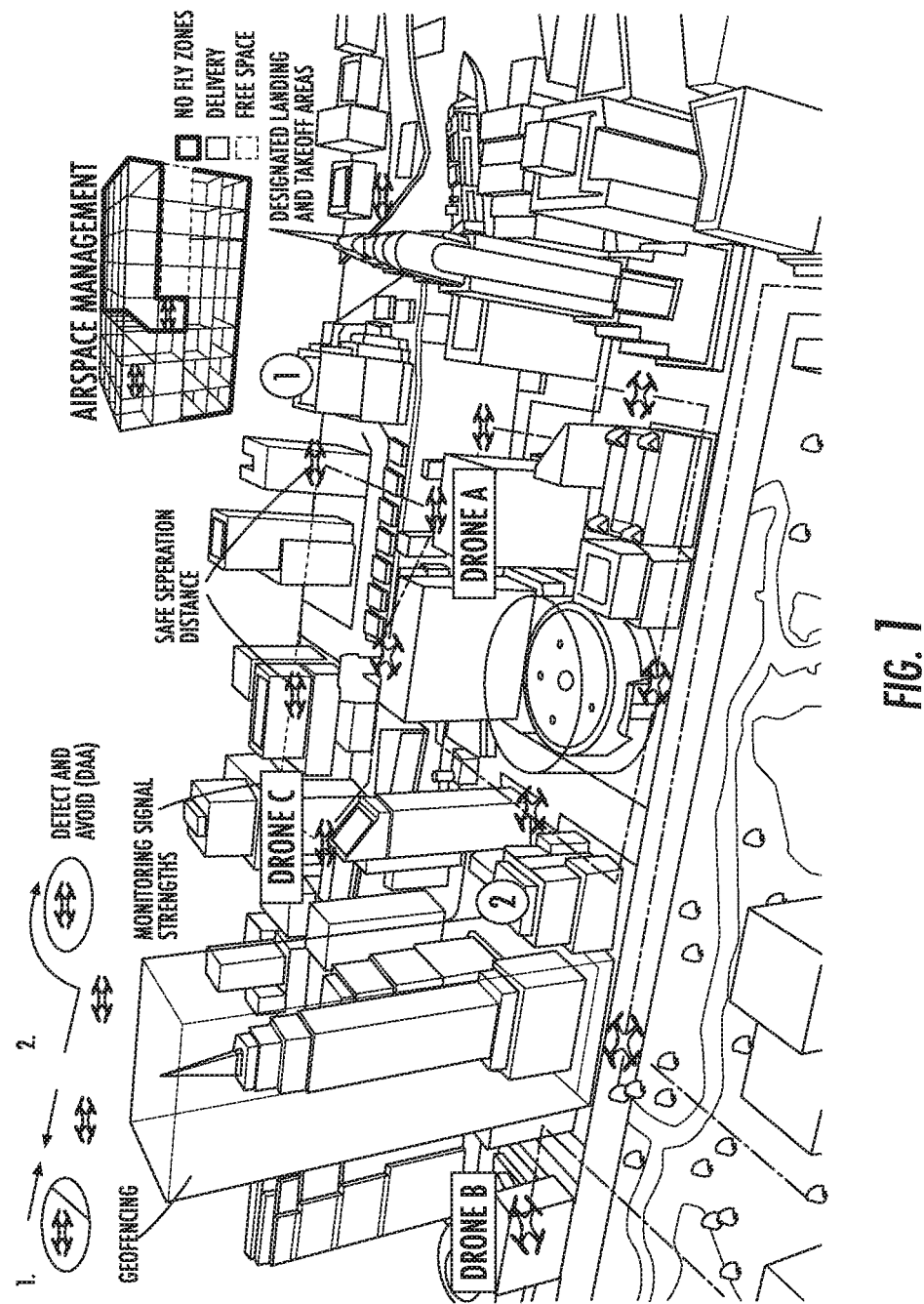
FIG. 1 shows multiple autonomous drone missions in an urban environment.

As the technology behind autonomous systems is starting to mature, they are being envisioned to perform greater variety of tasks. FIG. 1 shows a scenario where multiple quadrotors must fly a variety of missions in a common air space, including package delivery, surveillance, and infrastructure monitoring. Drone A is tasked with delivering a package, which it must do within 15 minutes and then return to base in the following 10 minutes. Drone B is tasked with periodic surveillance and data collection of the wildlife in the park, while Drone C is tasked with collecting sensor data from equipment on top of the white-and-blue building. All of these missions have complex spatial requirements (e.g. avoid flying over the buildings highlighted in red, perform surveillance or monitoring of particular areas and maintain safe distance from each other), temporal requirements (e.g., a deadline to deliver package, periodicity of visiting the areas to be monitored) and reactive requirements (like collision avoidance). The safe planning and control of multi-agent systems for missions like these is becoming an area of utmost importance. Most existing work for this either lacks the expressiveness to capture such requirements (e.g. [1], [2]), relies on simplifying abstractions that result in conservative behavior ([3]), or do not take into account explicit timing constraints ([4]). A more detailed coverage of existing methods can be found in Section I-A. In addition to these limitations, many of the planning methods are computationally intractable (and hence do not scale well or work in real-time) and provide guarantees only on a simplified abstraction of the system behavior ([3]).

In this work, we aim to overcome some of those limitations, by focusing on a single class of dynamical systems, namely multi-rotor drones, such as quadrotors. By using Signal Temporal Logic (STL) as the mission specification language, we retain the flexibility to incorporate explicit timing constraints, as well as a variety of behaviors. Without relying on oversimplifying abstractions, we provide guarantees on the continuous-time behavior of the dynamical system. We also show through experiments that the resulting behavior of the drones is not conservative. The control problem formulation we present is aimed to be tractable, and through both simulations and experiments on actual drones we show that we can control up to two drones in real-time and up to 16 in simulation.

A. State of the Art

The mission planning problem for multiple agents has been extensively studied. Most solutions work in an abstract grid-based representation of the environment [4], [5], and abstract the dynamics of the agents [6], [3]. As a consequence, they have correctness guarantees for the discrete behavior but not necessarily for the underlying continuous system. Multi-agent planning with kinematic constraints in a discretized environment has been studied in [7] with application to ground robots. Planning in a discrete road map with priorities assigned to agents has been studied in [2] and is applicable to a wide variety of systems. Another priority-based scheme for drones using a hierarchical discrete planner and trajectory generator has been studied in [1]. Most of these use Linear Temporal Logic (LTL) as the mission specification language, which doesn't allow explicit time bounds on the mission objectives. The work in [3] uses STL. Other than [2] and [1], none of the above methods can run in real-time because of their computational requirements. While [2] and [1] are real-time, they can only handle the Reach-Avoid mission, in which agents must reach a desired goal state while avoiding obstacles and each other.

In a more control-theoretic line of work, control of systems with STL or Metric Temporal Logic (MTL) specifications without discretizing the environment or dynamics has been studied in [8], [9], [10]. These methods are potentially computationally more tractable than the purely planning-based approaches discussed earlier but are still not applicable to real-time control of complex dynamical systems like quadrotors (e.g. see [10]), and those that rely on Mixed Integer Programming based approaches [8] do not scale well. Stochastic heuristics like [11] have also been used for STL missions but offer very few or no guarantees. Non-smooth optimization has also been explored, but only for safety properties [12].

In this paper, we focus on multi-rotor systems, and work with a continuous representation of the environment and take into account the behavior of the trajectories of the quadrotor. With the mission specified as a STL formula, we maximize a smooth version of the robustness ([3], [10]). This, unlike a majority of the work outlined above, allows us to take into account explicit timing requirements. Our method also allows us to use the full expressiveness of STL, so our approach is not limited to a particular mission type. Finally, unlike most of the work discussed above, we offer guarantees on the continuous-time behavior of the system to satisfy the spatiotemporal requirements. Through simulations and experiments on actual platforms, we show real-time applicability of our method for simple cases, as well as the scalability in planning for multiple quadrotors in a constrained environment for a variety of mission specifications.

B. Contributions

This paper presents a control framework for mission planning and execution for fleets of quadrotors, given a STL specification.

1) Continuous-time STL satisfaction: We develop a control optimization that selects waypoints by maximizing the robustness of the STL mission. A solution to the optimization is guaranteed to satisfy the mission in continuous-time, so trajectory sampling does not jeopardize correctness, while the optimization only works with a few waypoints.
2) Dynamic feasibility of trajectories: We demonstrate that the trajectories generated by our controller respect pre-set velocity and acceleration constraints, and so can be well-tracked by lower-level controllers.
3) Real-time control: We demonstrate our controllers suitability for online control by implementing it on real quadrotors and executing a reach-avoid mission.
4) Performance and scalability: We demonstrate our controllers speed and performance on real quadrotors, and its superiority to other methods in simulations.

The paper is organized as follows. Section II introduces STL and its robust semantics, while Section III introduces the control problem we aim to solve in this paper. Section IV presents the proposed control architecture and the trajectory generator we use and proves that the trajectories are dynamically feasible. The main control optimization is presented in Section V. Extensive simulation and experiments on real quadrotors are presented in Sections VI and VII.

II. PRELIMINARIES ON SIGNAL TEMPORAL LOGIC

Consider a continuous-time dynamical system H and its uniformly discretized version $$\dot{x}_c(t) = f_c(x_c(t), u(t)), x^+ = f(x, u) \qquad (1)$$

where $x \in X \subset \mathbb{R}^n$ is the current state of the system, $x^+$ the next state, $u \in U \subset \mathbb{R}^m$ is its control input and $f: X \times U \to X$ is differentiable in both arguments. The system's initial state $x_0$ takes values from some initial set $X_0 \subset \mathbb{R}^n$. In this paper we deal with trajectories of the same duration (e.g. 5 seconds) but sampled at different rates, so we introduce notation to make the sampling period explicit. Let $dt \in \mathbb{R}_+$ be a sampling period and $T \in \mathbb{R}_+$ be a trajectory duration. We write $[0:dt:T]=(0, dt, 2dt, \ldots, (H-1)dt)$ for the sampled time interval s.t. $(H-1)dt=T$ (we assume T is divisible by H−1). Given an initial state $x_0$ and a finite control input sequence $u=(u_0, u_{t_1}, \ldots, u_{t_{H-2}})$, $u_t \in U$, $t_k \in [0:dt:T]$, a trajectory of the system is the unique sequence of states $x=(x_0, x_{t_1}, \ldots, x_{t_{H-1}})$ s.t. for all $t \in [0:dt:T]$, $x_t$ is in X and $x_{t_{k+1}} = f(x_{t_k}, u_{t_k})$. We also denote such a trajectory by x[dt]. Given a time domain $\mathbb{T}=[0:dt:T]$, the signal space $X^\mathbb{T}$ is the set of all signals x: $\mathbb{T} \to X$. For an interval $I \subset \mathbb{R}_+$ and $t \in \mathbb{R}_+$, set $t+I=\{t+a | a \in I\}$. The max operator is written $\sqcup$ and min is written $\sqcap$.

A. Signal Temporal Logic (STL)

The controller of $\mathcal{H}$ is designed to make the closed loop system (1) satisfy a specification expressed in Signal Temporal Logic (STL) [13], [14]. STL is a logic that allows the succinct and unambiguous specification of a wide variety of desired system behaviors over time, such as "The quadrotor reaches the goal within 10 time units while always avoiding obstacles" and "While the quadrotor is in Zone 1, it must obey that zone's altitude constraints". Formally, let $M=\{\mu_1, \ldots, \mu_L\}$ be a set of real-valued functions of the state $\mu_k: X \to \mathbb{R}$. For each $\mu_k$ define the predicate $p_k:=\mu_k(x) \geq 0$. Set $AP:=\{p_1, \ldots, p_L\}$. Thus, each predicate defines a set, namely $p_k$ defines $\{x \in X | f_k(x) \geq 0\}$. Let $I \subset \mathbb{R}$ denote a nonsingleton interval, T the Boolean True, P a predicate, ¬ and ∧ the Boolean negation and AND operators, respectively, and $\mathcal{U}$ the Until temporal operator. An STL formula $\varphi$ is built recursively from the predicates using the following grammar:

$$\varphi := T | p | \neg \varphi | \varphi_1 \wedge \varphi_2 | \varphi_1 \mathcal{U}_I \varphi_2$$

Informally $\varphi_1 \mathcal{U}_I \varphi_2$ means that $\varphi_2$ must hold at some point in I, and until then, $\varphi_1$ must hold without interruption. The disjunction (υ), implication (⇒), Always (□) and Eventually (◇) operators can be defined using the above operators. Formally, the pointwise semantics of an STL formula $\varphi$ define what it means for a system trajectory x to satisfy $\varphi$.

Definition 2.1 (STL semantics): Let $\mathbb{T}=[0:dt:T]$. The Boolean truth value of $\varphi$ with respect to the discrete-time trajectory x: $\mathbb{T} \to X$ at time $t \in \mathbb{T}$ is defined recursively.

$(x,t) \models T \Leftrightarrow T$ $\forall p_k \in AP, (x,t) \models p \Leftrightarrow \mu_k(x_t) \geq 0$ $(x,t) \models \neg \varphi \Leftrightarrow \neg (x,t) \models \varphi$ $(x,t) \models \varphi_1 \wedge \varphi_2 \Leftrightarrow (x,t) \models \varphi_1 \wedge (x,t) \models \Phi_2$ $(x,t) \models \varphi_1 U_I \varphi_2 \Leftrightarrow \exists t' \in (t+I) \cap \mathbb{T}, (x,t') \models \varphi_2 \wedge \forall t'' \in (t, t') \cap \mathbb{T}, (x,t'') \models \varphi_1$ We say x satisfies $\varphi$ if $(x, 0) \models \varphi$. All formulas that appear in this paper have bounded temporal intervals: $0 \leq \inf I \leq \sup I < +\infty$. To evaluate whether such a bounded formula $\varphi$ holds on a given trajectory, only a finite-length prefix of that trajectory is needed. Its length can be upper-bounded by the horizon of $\varphi$, $\mathrm{hrz}(\varphi) \in \mathbb{N}$, calculable as shown in [8]. For example, the horizon of $\square_{[0,2]}(\lozenge_{[2,4]}p)$ is 2+4=6: we need to observe a trajectory of, at most, length 6 to determine whether the formula holds.

B. Control Using the Robust Semantics of STL

Designing a controller that satisfies the STL formula $\varphi_1$ is not always enough. In a dynamic environment, where the system must react to new unforeseen events, it is useful to have a margin of maneuverability. That is, it is useful to control the system such that we maximize our degree of satisfaction of the formula. When unforeseen events occur, the system can react to them without violating the formula. This degree of satisfaction can be formally defined and computed using the robust semantics of temporal logic [14], [15].

Definition 2.2 (Robustness[15], [14]): The robustness of STL formula $\varphi$ relative to x: $\mathbb{N} \to X$ at time $t \in \mathbb{N}$ is $\rho_T(x,t)=+\infty$ $\rho_{pk}(x,t)=\mu_k(x_t) \forall p_k \in AP,$ $\rho_{\neg \varphi}(x,t)=-\rho_\varphi(x,t)$ $\rho_{\varphi 1 \wedge \varphi 2}(x,t)=\rho_{\varphi 1}(x,t) \sqcap \rho_{\varphi 2}(x,t)$ $\rho_{\varphi 1 U_I \varphi 2}(x,t)= \sqcup_{t' \in (t+I) \cap \mathbb{T}} (\rho_{\varphi 2}(x,t') \sqcap \sqcap_{t'' \in [t,t') \cap \mathbb{T}} \rho_{\varphi 1}(x,t''))$ When t=0, we write $\rho_\varphi(x)$ instead of $\rho_\varphi(x,0)$. The robustness is a real-valued function of x with the following important property.

Theorem 2.1: [15] For any $x \in X^\mathbb{T}$ and STL formula $\varphi$, if $\rho_\varphi(x,t)<0$ then x violates $\varphi$ at time t, and if $\rho_\varphi(x,t)>0$ then x satisfies $\varphi$ at t. The case $\rho_\varphi(x,t)=0$ is inconclusive.

Thus, we can compute control inputs by maximizing the robustness over the set of finite input sequences of a certain length. The obtained sequence u* is valid if $\rho_\varphi(x^*,t)$ is positive, where X* and u* obey (1). The larger $\rho_\varphi(x^*, t)$, the more robust is the behavior of the system: intuitively, x* can be disturbed and $\rho_\varphi$ might decrease but not go negative. In fact, the amount of disturbance that x* can sustain is precisely $\rho_\varphi$: that is, if $x^* \models \varphi$, then $x^*+e \models \varphi$ for all disturbances e: $\mathbb{T} \to X$ s.t. $\sup_{t \in \mathbb{T}} \|e(t)\| < \rho_\varphi(x^*)$.

If $\mathbb{T}=[0, T]$ then the above naturally defines satisfaction of $\varphi$ by a continuous-time trajectory $y_e$: $[0, T] \to X$.

III. CONTROL USING A SMOOTH APPROXIMATION OF STL ROBUSTNESS

The goal of this work is to find a provably correct control scheme for fleets of quadrotors, which makes them meet a control objective $\varphi$ expressed in temporal logic. So, let $\epsilon > 0$ be a desired minimum robustness. We solve the following problem.

$$P: \max_{u \in U^{N-1}} \rho_\varphi(x) \quad (2a)$$

$$\text{s.t. } x_{k+1} = f(x_k, u_k), \forall k = 0, \ldots, N-1 \quad (2b)$$

$$x_k \in X, u_k \in U \forall k = 0, \ldots, N \quad (2c)$$

$$\rho_\varphi(x) \geq \epsilon \quad (2d)$$

Because $\rho_\varphi$ uses the non-differentiable functions max and min (see Def. 2.2), it is itself non-differentiable as a function of the trajectory and the control inputs. A priori, this necessitates the use of Mixed-Integer Programming solvers [8], non-smooth optimizers [16], or stochastic heuristics [11] to solve $P_\rho$. However, it was recently shown in [10] that it is more efficient and more reliable to instead approximate the non-differentiable objective $\rho_\varphi$ by a smooth (infinitely differentiable) function $\tilde{\rho}_\varphi$ and solve the resulting optimization problem $\tilde{P}$ using Sequential Quadratic Programming. The approximate smooth robustness is obtained by using smooth approximations of min and max in Def. 2.2. In this paper, we also use the smoothed robustness $\tilde{\rho}_\varphi$ and solve $\tilde{P}$ instead of P. The lower bound on robustness (2d) is used to ensure that if $\tilde{\rho}_\varphi \geq \epsilon$ then $\rho_\varphi \geq 0$. In [10] it was shown that an $\epsilon$ can be computed such that $|\rho_\varphi - \tilde{\rho}_\varphi| \leq \epsilon$. This approach was called Smooth Operator [10].

Despite the improved runtime of Smooth Operator, our experiments have shown that it is not possible to solve $\tilde{P}$ in real-time using the full quadrotor dynamics. Therefore, in this paper, we develop a control architecture that is guaranteed to produce a correct and dynamically feasible quadrotor trajectory. By 'correct', we mean that the continuous-time, non-sampled trajectory satisfies the formula $\varphi$, and by 'dynamically feasible', we mean that it can be implemented by the quadrotor dynamics. This trajectory is then tracked by a lower-level MPC tracker. The control architecture and algorithms are the subject of the next section.

IV. QUADROTOR CONTROL ARCHITECTURE

Figure 3:
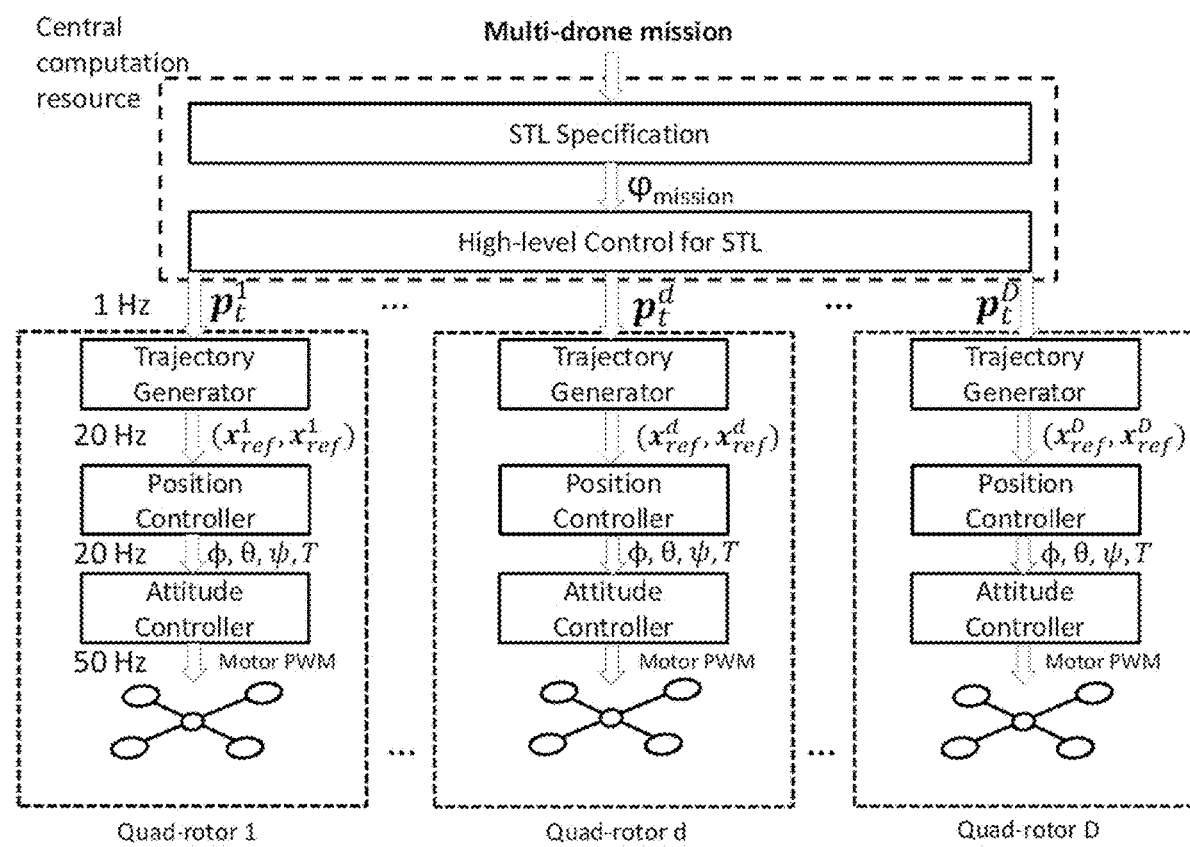
FIG. 3 is a block diagram illustrating an example of a quadrotor control architecture.

FIG. 3 shows the control architecture used in this paper, and its components are detailed in what follows. The overall idea is that we want the continuous-time trajectory $y_c:[0,T] \to X$ of the quadrotor to satisfy the STL mission $\varphi$, but can only compute a discrete-time trajectory $x:[0:dt:T] \to X$ sampled at a low rate $1/dt$. So, we do two things, illustrated in FIG. 3: A) to guarantee continuous-time satisfaction from discrete-time satisfaction, we ensure that a discrete-time high-rate trajectory $q:[0:dt':T] \to X$ satisfies a suitably stricter version $\varphi_s$ of $\varphi$. This is detailed in Section V. B) To compute, in real-time, a sufficiently high-rate discrete-time $q[dt']$ that satisfies $\varphi_s$, we perform a (smooth) robustness maximization over a low-rate sequence of waypoints x with sampling period $dt \gg dt'$. In the experiments (Sections VI and VII) we used $dt=1$ s and $dt'=50$ ms. The optimization problem is such that the optimal low-rate trajectory $x:[0:dt:T] \to X$ and the desired high-rate q are related analytically: $q = L(x)$ for a known $L: \mathbb{R}^{(T/dt)} \to \mathbb{R}^{(T/dt')}$. So the robustness optimization maximizes $\tilde{\rho}_{\varphi_s}(L(x))$, automatically yielding $q[dt']$. Moreover, we must add constraints to ensure that q is dynamically feasible, i.e., can be implemented by the quadrotor dynamics. Thus, qualitatively, the optimization problem we solve is $$\max_{x[dt]} \tilde{\rho}_{\varphi_s}(L(x[dt])) \quad (3)$$

s.t. $L(x[dt])$ obeys quadrotor dynamics and is feasible x and $L(x[dt])$ are in the allowed air space $\tilde{\rho}_{\varphi_s}(L(x[dt])) \geq \varepsilon$ The mathematical formulation of the above problem, including the trajectory generator L, is given in Section IV-A. But first, we end this section by a brief description of the position and attitude controllers that take the high-rate $q[dt']$ and provide motor forces to the rotors, and a description of the quadrotor dynamics. The state of the quadrotor consists of its 3D position p and 3D linear velocity $\upsilon = \dot{p}$. A more detailed version of the quad-rotor dynamics is in Section IX-A.

Position controller. To track the desired positions and velocities from the trajectory generator, we consider a Model Predictive Controller (MPC) formulated using the quadrotor dynamics of (17) linearized around hover. Given desired position and velocity commands in the fixed-world x, y, z coordinates, the controller outputs a desired thrust, roll, and pitch command (yaw fixed to zero) to the attitude controller. This controller also takes into account bounds on positions, velocities and the desired roll, pitch and thrust commands.

Attitude controller. Given a desired angular position and thrust command generated by the MPC, the high-bandwidth (50-100 Hz) attitude controller maps them to motor forces. In our control architecture, this is implemented as part of the preexisting firmware on board the Crazyflie 2.0 quadrotors. An example of an attitude controller can be found in [17].

A. The Trajectory Generator

The mapping L between low-rate $x[dt]$ and high-rate $y[dt']$ is implemented by the following trajectory generator, adapted from [18]. It takes in a motion duration $T_f > 0$ and a pair of position, velocity and acceleration tuples, called waypoints: an initial waypoint $q_0 = (p_0, \upsilon_0, a_0)$ and a final waypoint $q_f = (p_f, \upsilon_f, a_f)$. It produces a continuous-time minimum-jerk (time derivative of acceleration) trajectory $q(t) = (p(t), \upsilon(t), a(t))$ of duration $T_f$ s.t. $q(0) = q_0$ and $q(T_f) = q_f$. In our control architecture, the waypoints are the elements of the low-rate x computed by solving (3). The generator of [18] formulates the quadrotor dynamics in terms of 3D jerk and this allows a decoupling of the equations along three orthogonal jerk axes. By solving three independent optimal control problems, one along each axis, it obtains three minimum-jerk trajectories, each being a spline $q^*:[0,T_f] \to \mathbb{R}^3$ of the form:

$$\begin{bmatrix} p^*(t) \\ \upsilon^*(t) \\ a^*(t) \end{bmatrix} = \begin{bmatrix} \frac{\alpha}{120}t^5 + \frac{\beta}{24}t^4 + \frac{\gamma}{6}t^3 + a_0 t^2 + \upsilon_0 t + p_0 \\ \frac{\alpha}{24}t^4 + \frac{\beta}{6}t^3 + \frac{\gamma}{2}t^2 + a_0 t + \upsilon_0 \\ \frac{\alpha}{6}t^3 + \frac{\beta}{2}t^2 + \gamma t + a_0 \end{bmatrix} \quad (4)$$

Here, $\alpha$, $\beta$, and $\gamma$ are scalar linear functions of the initial $q_0$ and final $q_f$. Their exact expressions depend on the desired type of motion:

1. Stop-and-go motion. [18] This type of motion yields straight-line position trajectories $p(\cdot)$. These are suitable for navigating tight spaces, since we know exactly the robot's path between waypoints. For Stop-and-Go, the quadrotor starts from rest and ends at rest $\upsilon_0 = a_0 = \upsilon_f = a_f = 0$. I.e. the quadrotor must come to a complete stop at each waypoint. In this case, the constants are defined as follows:

$$\begin{bmatrix} \alpha \\ \beta \\ \gamma \end{bmatrix} = \frac{1}{T_f^5} \begin{bmatrix} 720(p_f - p_0) \\ -360 T_f (p_f - p_0) \\ 60 T_f^2 (p_f - p_0) \end{bmatrix} \quad (5)$$

2. Trajectories with free endpoint velocities [18] Stop-and-go trajectories have limited reach, since the robot must spend part of the time coming to a full stop at every waypoint. In order to get better reach, the other case from [18] that we consider is when the desired initial and endpoint velocities, $\upsilon_0$ and $\upsilon_f$, are free. Like the previous case, we still assume $a_0 = a_f = 0$. The constants in the spline (4) are then:

$$\begin{bmatrix} \alpha \\ \beta \\ \gamma \end{bmatrix} = \frac{1}{T_f^5} \begin{bmatrix} 90 & -15 T_f^2 \\ -90 T_f & 15 T_f^3 \\ 30 T_f^2 & -3 T_f^4 \end{bmatrix} \begin{bmatrix} p_f - p_0 - \upsilon_0 T_f \\ a_f - a_0 \end{bmatrix} \quad (6)$$

Figure 4:
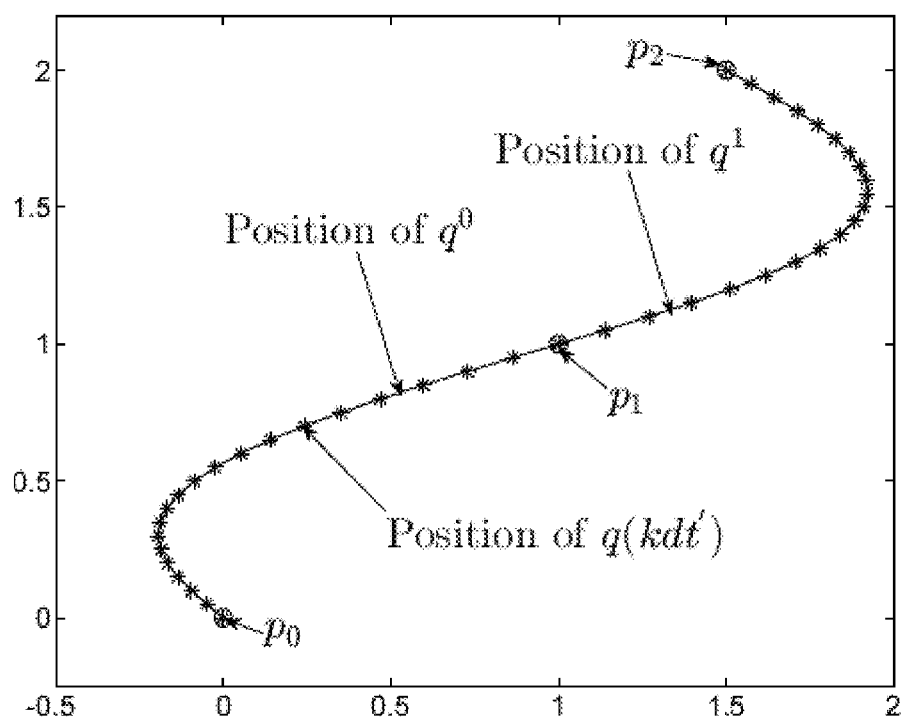
FIG. 4 is graph illustrating planar splines connecting position waypoints.

In this case, the trajectories between waypoints are not restricted to be on a line, allowing for a wider range of maneuvers, as will be demonstrated in the simulations of Section VI. An example of such a spline (planar) is shown in FIG. 4.

B. Constraints for Dynamically Feasible Trajectories

The splines (4) that define the trajectories come from solving an unconstrained optimal control problem, so they are not guaranteed to respect any state and input constraints, and thus might not be dynamically feasible. By dynamically feasible, we mean that the quadrotor can be actuated (by the motion controller) to follow the spline. Typically, feasibility requires that the spline velocity and acceleration be within certain bounds. E.g. a sharp turn is not possible at high speed but can be done at low speed. Therefore, we formally define dynamic feasibility as follows.

Definition 4.1 (Dynamically feasible trajectories): Let $[\underline{\upsilon}, \overline{\upsilon}]$ be bounds on velocity and $[\underline{a}, \overline{a}]$ be bounds on acceleration. A trajectory $q:[0,T_f] \to \mathbb{R}^3$, with $q(t)=(p(t), \upsilon(t), a(t))$, is dynamically feasible if $\upsilon(t) \in [\underline{\upsilon},\overline{\upsilon}]$ and $a(t) \in [\underline{\upsilon},\overline{\upsilon}]$ for all $t \in [0,T_f]$ for each of the three axes of motion.

Assumption 4.1: We assume that dynamically feasible trajectories, as defined here, can be tracked almost perfectly by the position (and attitude) controller. This assumption is validated by our experiments on physical quadrotor platforms. See Section VII.

In this section we derive constraints on the desired end state $(p_f, \upsilon_f, a_f)$ such that the resulting trajectory $q(\cdot)$ computed by the generator [18] is dynamically feasible.

Since the trajectory generator works independently on each jerk axis, we derive constraints for a one-axis spline given by (4). An identical analysis applies to the splines of other axes. Since a quadrotor can achieve the same velocities and accelerations in either direction along an axis, we take $\underline{\upsilon}<0<\overline{\upsilon}=-\underline{\upsilon}$ and $\underline{a}<0<\overline{a}=-\underline{a}$. We derive the bounds for the two types of motion described earlier.

Stop-and-go trajectories: $v_f=v_0=0=a_f=a_0=0$ Since the expressions for the splines are linear in $p_f$ and $P_0$ ((4), (5)), without loss of generality we assume $p_0=0$. By substituting (5) in (4), we get:

$$p_t^* = \left(6\frac{t^5}{T_f^5} - 15\frac{t^4}{T_f^4} + 10\frac{t^3}{T_f^3}\right)p_f \qquad (7a)$$

$$v_t^* = \underbrace{\left(30\frac{t^4}{T_f^5} - 60\frac{t^3}{T_f^4} + 30\frac{t^2}{T_f^3}\right)}_{K_1(t)}p_f \qquad (7b)$$

$$a_t^* = \underbrace{\left(120\frac{t^3}{T_f^5} - 180\frac{t^2}{T_f^4} + 60\frac{t}{T_f^3}\right)}_{K_2(t)}p_f \qquad (7c)$$

Figure 10:
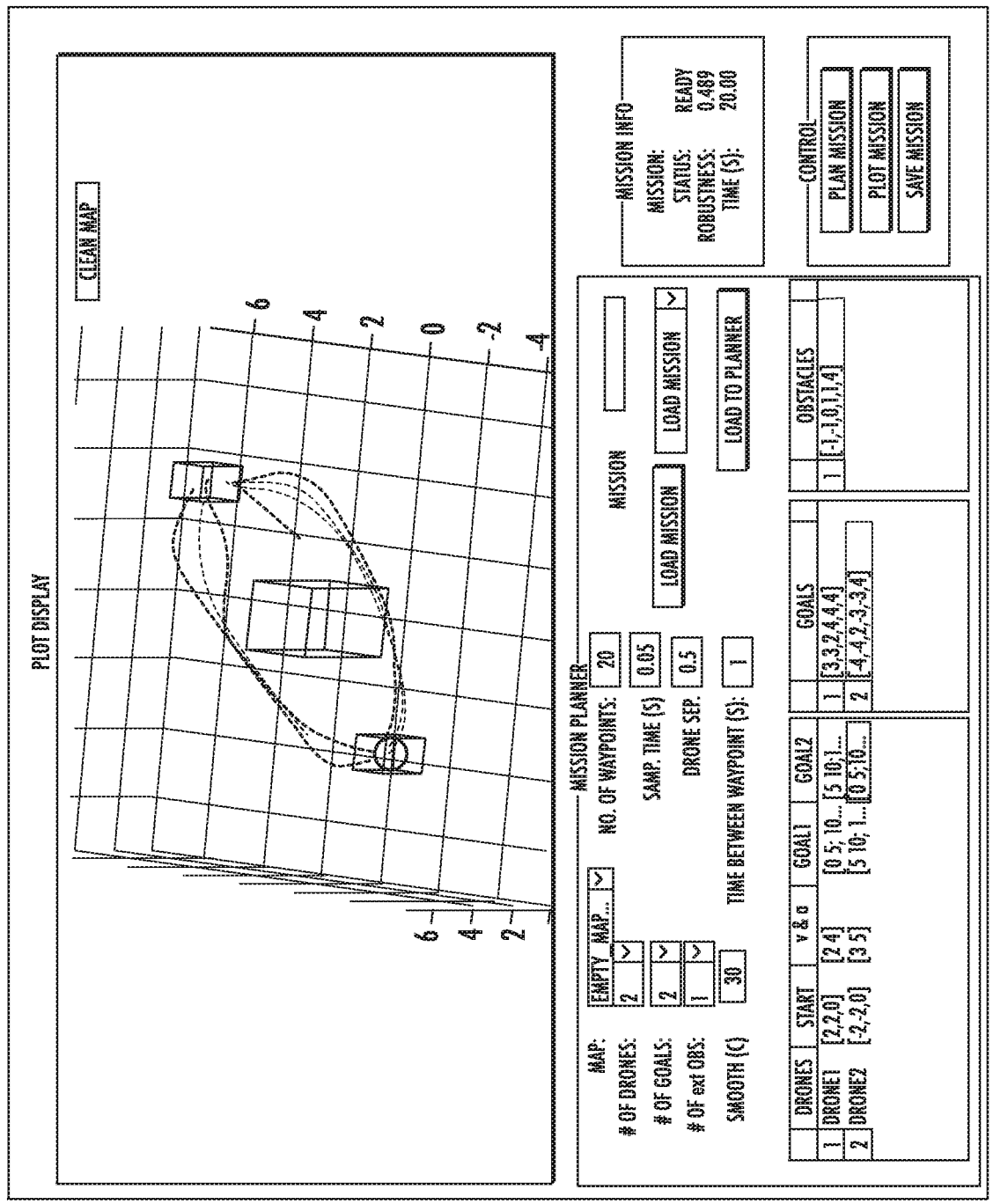
FIG. 10 illustrates an example user interface and the planned trajectories for a two UAS patrolling mission.

FIG. 10 in the appendix shows the functions $K_1$ and $K_2$ for $T_f=1$. The following lemma is proved by examining the first two derivatives of $K_1$ and $K_2$.

Lemma 4.1: The function $K_1:[0,T_f] \to \mathbb{R}$ is nonnegative and log-concave. The function $K_2:[0,T_f] \to \mathbb{R}$ is anti-symmetric around $t=T_f/2$, concave on the interval $t \in [0,T_f/2)$ and convex on the interval $[T_f/2, T_f]$.

Let $\max_{t \in [0,T_f]} K_1(t) = K_1^*$ and $\max_{t \in [0,T_f]} |K_2(t)| = K_2^*$. These are easily computed thanks to Lemma 4.1. We can now state the feasibility constraints for Stop-and-Go motion. See the appendix for a proof sketch.

Theorem 4.1 (Stop-and-go feasibility): Given an initial position $p_0$ (and $\upsilon_0=a_0=0$), a maneuver duration $T_f$, and desired bounds $[\underline{\upsilon}, \overline{\upsilon}]$ and $[\underline{a}, \overline{a}]$ if $\underline{\upsilon}/K_1^* \leq p_f - p_0 \leq \overline{\upsilon}/K_1^*$ and $\underline{a}/K_2^* \leq p_f - p_0 \leq \overline{a}/K_2^*$ then $\upsilon_t^* \in [\underline{\upsilon}, \overline{\upsilon}]$ and $a_t^* \in [\underline{a}, \overline{a}]$ for all $t \in [0,T_f]$.

Since $\underline{\upsilon}, \overline{\upsilon}, \underline{a}, \overline{a}, K_1^*, K_2^*$ are all available offline, they can be used as constraints if solving problem (3) offline.

Free end velocities: $a_f=a_0=0$, free $\upsilon_f$. Here too, without loss of generality $p_0=0$. Substituting (6) in (4) and rearranging terms yields the following expression for the optimal translational state:

$$p_t^* = \left(\frac{90t^5}{240T_f^5} - \frac{90t^4}{48T_f^4} + \frac{30t^3}{12T_f^3}\right)p_f - \left(\frac{90t^5}{240T_f^5} - \frac{90t^4}{48T_f^4} + \frac{30t^3}{12T_f^2} - t\right)v_0 \qquad (8)$$

$$v_t^* = \underbrace{\left(\frac{90t^4}{48T_f^5} - \frac{90t^3}{12T_f^4} + \frac{30t^2}{4T_f^3}\right)}_{K_3(t)}p_f - \left(\frac{90t^4}{48T_f^4} - \frac{90t^3}{12T_f^3} + \frac{30t^2}{4T_f^2} - 1\right)v_0$$

$$a_t^* = \underbrace{\left(\frac{90t^4}{12T_f^5} - \frac{90t^2}{4T_f^4} + \frac{30t}{2T_f^3}\right)}_{K_4(t)}p_f - \left(\frac{90t^3}{12T_f^4} - \frac{90t^2}{4T_f^3} + \frac{30t}{2T_f^2}\right)v_0$$

Applying the velocity and acceleration bounds $\underline{\upsilon} \leq \upsilon^* \leq \overline{\upsilon}$ and $\underline{a} \leq a^* \leq \overline{a}$ to (8) and re-arranging terms yields $$\frac{(\underline{\upsilon} - (1 - T_f K_3(t))v_0)}{K_3(t)} \leq p_f \leq \frac{(\overline{\upsilon} - (1 - T_f K_3(t))v_0)}{K_3(t)} \ \forall t \in [0, T_f] \qquad (9a)$$

$$\underline{a}/K_4(t) = T_f v_0 \leq p_f \leq \overline{a}/K_4(t) + T_f v_0 \ \forall t \in [0, T_f] \qquad (9b)$$

Figure 5:
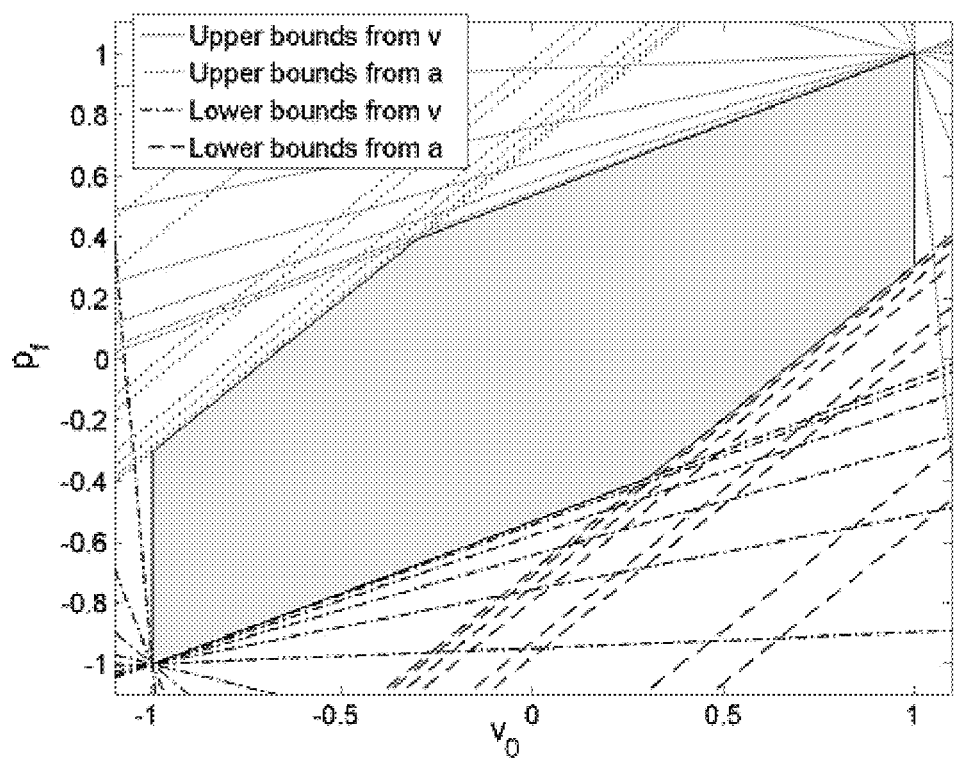
FIG. 5 illustrates the upper and lower bounds on $p_f$ due to acceleration and velocity constraints.

The constraints on $p_f$ are linear in $v_0$, but parametrized by functions of t. Since t is continuous in $[0,T_f]$, (9) is an infinite system of linear inequalities. FIG. 5 shows these linear bounds for $t=0, 0.1, 0.2, \ldots, 1=T_f$ with $\overline{\upsilon}=1=-\underline{\upsilon}$, $\overline{a}=2=-\underline{a}$. FIG. 10 in the appendix shows the functions $K_3$ and $K_4$ for $T_f=1$.

The infinite system can be reduced to 2 inequalities only.

Lemma 4.2: $p_f$ satisfies (9) if it satisfies the following $$\frac{\underline{\upsilon} - (1 - T_f K_3(T_f))v_0}{K_3(T_f)} \leq p_f \leq \frac{\overline{\upsilon} - (1 - T_f K_3(T_f))v_0}{K_3(T_f)} \qquad (10)$$

$$T_f v_0 + \underline{a}/K_4(t') \leq p_f \leq T_f v_0 + \overline{a}/K_4(t')$$

where t' is a solution of the quadratic equation $$\frac{dK_4(t)}{dt} = 0,$$

such that $t' \in [0, T_f]$.

The main result follows:

Theorem 4.2 (Free endpoint velocity feasibility): Given an initial translational state $p_0$, $v_0 \in [\underline{\upsilon}, \overline{\upsilon}]$, $a_0=0$, and a maneuver duration $T_f$, if $p_f$ satisfies $$\frac{\underline{\upsilon} - (1 - T_f K_3(T_f))v_0}{K_3(T_f)} \leq p_f - p_0 \leq \frac{\overline{\upsilon} - (1 - T_f K_3(T_f))v_0}{K_3(T_f)} \qquad (11)$$

$$T_f v_0 + \underline{a}/K_4(t') \leq p_f - p_0 \leq T_f v_0 + \overline{a}/K_4(t')$$

with t' defined as in Lemma 4.2, then $\upsilon^*(t) \in [\underline{\upsilon}, \overline{\upsilon}]$ and $a_t^* \in [\underline{a}, \overline{a}]$ for all $t \in [0, T_f]$ and $p^*(T_f) = p_f$.

V. CONTROL OF QUADROTORS FOR SATISFACTION OF STL SPECIFICATIONS

We are now ready to formulate the mathematical robustness maximization problem we solve for temporal logic planning. We describe it for the Free Endpoint Velocity motion; an almost-identical formulation applies for the Stop-and-Go case with obvious modifications.

Recall the notions of low-rate trajectory x and high-rate discrete-time trajectory q defined in Section IV. Consider an initial translational state $x_I = (p_I, \upsilon_I)$ and a desired final position $p_f$ to be reached in $T_f$ seconds, with free end velocity and zero acceleration. Given such a pair, the generator of Section IV-A computes a trajectory $q = (p, \upsilon, a):[0, T_f] \to \mathbb{R}^9$ that connects $p_I$ and $p_f$. By (4), for every $t \in [0, T_f]$, $q(t)$ is a linear function of $p_I$, $p_f$ and $\upsilon_I$. If the spline $q(\cdot)$ is uniformly sampled with a period of dt', let $H = T_f/dt'$ be the number of discrete samples in the interval $[0, T_f]$. Every $q(dt')$ (sampled point along the spline) is a linear function of $p_I$, $\upsilon_I$, $p_f$. Hereinafter, we use $$x_I \xrightarrow{T_f} x_f$$

as shorthand for saying that $x_I$ is the initial state, and $x_f = (p_f, \upsilon_f)$ is the final state with desired end position $p_f$ and end velocity $\upsilon_f = \upsilon(T_f)$ computed using the spline.

More generally, consider a sequence of low-rate waypoints $$\left( x_0 \xrightarrow{T_f} x_1, x_1 \xrightarrow{T_f} x_2, \ldots, x_{N-1} \xrightarrow{T_f} x_N \right),$$

and a sequence $(q^k)_{k=0}^{N-1}$ of splines connecting them and their high-rate sampled versions $\hat{q}^k$ sampled with a period $dt' \ll T_f$. Then every sample $q^k(i \cdot dt')$ is a linear function of $p_{k-1}$, $\upsilon_{k-1}$ and $p_k$.

We now put everything together. Write $\hat{q} = (q^0(0), \ldots, q^{N-1}(Hdt)) \in \mathbb{R}^{9N(H-1)}$, $x = ((p_0, \upsilon_0), \ldots, (p_{N-1}, \upsilon_{N-1})) \in \mathbb{R}^{6N}$, and let $L: \mathbb{R}^{6N} \to \mathbb{R}^{9N(H-1)}$ be the linear map between them. In the Stop-and-Go case, this uses all velocities to 0 and uses (7) for positions, and in the free velocity case, L uses (8). The robustness maximization problem is finally:

$$\max_x \tilde{\rho}_{\varphi_s}(L(x)) \quad (12a)$$

$$\text{s.t. } LB_\upsilon(\upsilon_{k-1}) \leq p_k - p_{k-1} \leq UB_\upsilon(\upsilon_{k-1}) \forall k = 1, \ldots, N, \quad (12b)$$

$$LB_a(\upsilon_{k-1}) \leq p_k - p_{k-1} \leq UB_a(\upsilon_{k-1}) \forall k = 1, \ldots, N, \quad (12c)$$

$$\tilde{\rho}_{\varphi_s}(L(x)) \geq \varepsilon \quad (12d)$$

where (12b) and (12c) are the constraints from (11) in Free Endpoint Velocity motion, and Thm. 4.1 in Stop-and-Go motion, with $p_I = p_{k-1}$ and $p_f = p_k$.

Since the optimization variables are only the waypoints p, and not the high-rate discrete-time trajectory q, this makes the optimization problem much more tractable. In general, the number N of low-rate waypoints p is a design choice that requires some mission specific knowledge. The higher N is, the more freedom of movement there is, but at a cost of increased computation burden of the optimization (more constraints and variables). A very small N on the other hand will restrict the freedom of motion and might make it impossible for the resulting trajectory to satisfy the STL specification.

A. Strictification for Continuous Time Guarantees

In general, if the sampled trajectory q satisfies $\varphi$, this does not guarantee that the continuous-time trajectory q also satisfies it. For that, we use [19, Thm. 5.3.1], which defines a strictification operator str: $\varphi \to \varphi_s$ that computes a syntactical variant of $\varphi$ having the following property. Theorem 5.1: [19] Let dt be the sampling period, and suppose that there exists a constant $\Delta_g \geq 0$ s.t. for all t, $\|q(t) - q(t+dt)\| \leq \Delta_g dt$. Then $\rho_{\varphi_s}(q) > \Delta_g \Rightarrow (q, 0) \models \varphi$. Intuitively, the stricter $\varphi_s$ tightens the temporal intervals and the predicates $\mu_k$ so it is 'harder' to satisfy $\varphi_s$ than $\varphi$. See [19, Ch. 5]. For the trajectory generator g of Section IV-A, $\Delta_g$ can be computed given $T_f$, $\underline{\upsilon}$, $\overline{\upsilon}$, $\underline{a}$ and $\overline{a}$.

We need the following easy-to-prove result, to account for the fact that we optimize a smoothed robustness:

Corollary 5.1.1: Let "be the worst-case approximation error for smooth robustness. If $\tilde{\rho}_{\varphi_s}(q) > \Delta_g + \varepsilon$ then $(q, 0) \models \varphi$.

B. Robust and Boolean Modes of Solution

The control problem of (12) can be solved in two modes [8]: the Robust (R) Mode, which solves the problem until a maximum is found (or some other optimizer-specific criterion is met) and a Boolean (B) Mode, in which the optimization (12) stops as soon as the smooth robustness value exceeds $\varepsilon$.

C. Implementation of the Control

The controller can be implemented in one of two ways:
One-shot: The optimization of (12) is solved once at time 0 and the resulting trajectories are then used as a plan for the quadrotors to follow. In our simulations, where there are no disturbances, this method is acceptable or when any expected disturbances are guaranteed to be less than $\tilde{\rho}^*$, the robustness value achieved by the optimization.

Shrinking horizon: In practice, disturbances and modeling errors necessitate the use of an online feedback controller. We use a shrinking horizon approach. At time 0, the waypoints are computed by solving (12) and given to the quadrotors to track. Then every $T_f$ seconds, estimates for p, $\upsilon$, a are obtained, and the optimization is solved again, while fixing all variables for previous time instants to their observed/computed values, to generate new waypoints for the remaining duration of the trajectory. For the $k^{th}$ such optimization, we re-use the $k-1^{st}$ solution as an initial guess. This results in a faster optimization that can be run online, as will be seen in the experiments.

VI. SIMULATIONS RESULTS

We demonstrate the efficiency and the guarantees of our method through multiple examples, in simulation and in real experiments. For the simulations, we consider two case studies: a) A multi-drone reach-avoid problem in a constrained environment, and b) A multi-mission example where several drones must fly one of two missions in the same environment. We assume a disturbance-free environment, and solve the problem in one shot, i.e. the entire trajectory that satisfies the mission is computed in one go (aka open-loop).

A. Simulation Setup

The following simulations were done in MATLAB 2016b, with the optimization formulated in Casadi [20] with Ipopt [21] as the NLP solver. HSL routines [22] were used as internal linear solvers in Ipopt. All simulations were run on a laptop with a quadcore i7-7600 processor (2.8 Ghz) and 16 Gb RAM running Ubuntu 17.04. For all simulations, waypoints are separated by $T_f=1$ second.

B. Multi Drone Reach-Avoid Problem

The objective of the drone d is to reach a goal set Goal ($[1.5, 2]\times[1.5, 2]\times[0.5, 1]$) within the time interval $[0,T]$, while avoiding an unsafe set Unsafe ($[-1, 1]\times[-1, 1]\times[0, 1]$) throughout the interval, in the 3D position space. This environment is similar to the one in FIG. 7. With p denoting the drone's 3D position, the mission for a single drone d is:

$$\varphi_{sra}^d \Box_{[0,T]} \neg(p \in \text{Unsafe}) \wedge \Diamond_{[0,T]}(p \in \text{Goal}) \tag{13}$$

The Multi drone Reach-Avoid problem adds the requirement that every two drones d,d' must maintain a minimum separation $\delta_{min} > 0$ from each other $\varphi_{sep}^{d,d'} = \Box_{[0,T]}(\|p^d - p^{d'}\| \geq \delta_{min}$. Assuming the number of drones is D, the specification reads:

$$\varphi_{mra} = \bigwedge_{d=1}^{D} \varphi_{sra}^d (\bigwedge_{d' \neq d} \varphi_{sep}^{d,d'}) \tag{14}$$

The horizon of this formula is hrz($\varphi_{mra}$)=T. The robustness of $\varphi_{mra}$ is upper-bounded by 0.25, which is achievable if all drones visit the center of the set Goal (as defined above)—at that time, they would be 0.25 m away from the boundaries of Goal—and maintain a minimum distance of 0.25 to Unsafe and each other. We analyze the runtimes and achieved robustness of our controller by running 100 simulations, each one from different randomly-chosen initial positions of the drones in the free space X/(Goal∪Unsafe)).

1) Stop and go trajectories: We show the results of controlling using (12) to satisfy $\varphi_{mra}$ for the case of Stop-and-Go motion (see Section IV-A) with T=6 seconds. Videos of the computed trajectories are available at link 1 (in Boolean mode) and at link 2 (in Robust Mode) in Table V.

Table I shows the run-times for an increasing number of drones D in the Robust and Boolean modes. It also shows the robustness of the obtained optimal trajectories in Robust mode. (We maximize smooth robustness, then compute true robustness on the returned trajectories). As D increases, the robustness values decrease. Starting from the upper bound of 0:25 with 1 drone, the robustness decreases to an average of 0:122 for D=5. This is expected, as more and more drones must visit Goal within the same time [0.6], while maintaining a pairwise minimum separation of $\delta_{min}$. As a result, the drones cannot get deep into the goal set, and this lowers the robustness value.

Up to 5 drones, the controller is successful in accomplishing the mission every time. By contrast, for D>5, the controller starts failing, in up to half the simulations. We conclude that for T=6, the optimization can only handle up to 5 drones for this mission, in this environment.

Comparison to MILP-based solution. The problem of maximizing $\rho_{\varphi_{min}}(y)$ to satisfy $\varphi_{mra}$ can be encoded as a Mixed Integer Linear Program (MILP) and solved. The tool BluSTL [8] implements this approach. We compare our runtimes to those of BluSTL for the case D=1. The robustness maximization in BluSTL took 1.2±0.3 s (mean±standard deviation) and returned a robustness value of 0:25 for each simulation, while the Boolean mode took 0.6±0.2 s seconds. (Note we do not include the time it takes BluSTL to encode the problem in these numbers.) Thus, our approach out-performs MILP in both modes. For D>1, BluSTL could not return a solution with positive robustness. The negative-robustness solutions it did return required several minutes to compute. It should however be noted that BluSTL is a general-purpose tool for finding trajectories of dynamical systems that satisfy a given STL specification, while our approach is tailored to the particular problem of controlling multi-rotor robots for satisfying a STL specification.

TABLE I

Stop-and-Go motion. Mean ± standard deviation for runtimes (in seconds) and robustness values from 100 runs of the reach-avoid problem.

| D | Boolean mode | Robust mode | $\rho^*$ (Robust mode) |
|---|---|---|---|
| 1 | 0.078 ± 0.004 | 0.40 ± 0.018 | 0.244 ± 0 |
| 2 | 0.099 ± 0.007 | 1.313 ± 0.272 | 0.198 ± 0.015 |
| 3 | 0.134 ± 0.015 | 2.364 ± 0.354 | 0.176 ± 0.018 |
| 4 | 0.181 ± 0.024 | 3.423 ± 0.370 | 0.160 ± 0.031 |
| 5 | 0.214 ± 0.023 | 7.009 ± 3.177 | 0.122 ± 0.058 |

2) Trajectories with free end point velocities: We also solved the multi-drone reach-avoid problem for Free Velocity motion (Section IV-A), with T=6. An instance of the resulting trajectories is available in links 3 and 4 for Boolean mode and at links 5 and 6 for Robust mode in Table V in the appendix. Table II shows the runtimes for an increasing number of drones D in the Robust and Boolean modes. It also shows the robustness of the obtained optimal trajectories in Robust mode. As before, the achieved robustness value decreases as D increases. Unlike the stop-and-go case, positive robustness solutions are achieved for all simulations, up to D=16 drones. This is due to the added freedom of motion between waypoints. This matches the intuition that a wider range of motion is possible when the quadrotors do not have to come to a full stop at every waypoint. For this case, we did not compare with BluSTL as the there is no easy way to incorporate this formulation in BluSTL.

Discussion The simulations show the performance and scalability of our method, finding satisfying trajectories for $\varphi_{mra}$ for 16 drones in less than 2 seconds on average, while maximizing robustness in 35 seconds. On the other hand, the MILP-based approach does not scale well, and for the cases where it does work, is considerably slower than our approach.

Since the high-level control problem is solved at 1 Hz, the runtimes (in the boolean mode) suggest that we can control up to 2 drones online in real-time without too much computation delay: Stop-and-Go takes an average of 0.099 s for 2 drones.

TABLE II

Free Endpoint Velocity motion. Mean ± standard deviation for runtimes (in seconds) and robustness values from 100 runs of the reach-avoid problem

| D | Boolean mode | Robust mode | $\rho^*$ (Robust mode) |
|---|---|---|---|
| 1 | 0.081 ± 0.005 | 0.32 ± 0.18 | 0.247 ± 0 |
| 2 | 0.112 ± 0.016 | 0.86 ± 0.15 | 0.188 ± 0.026 |
| 5 | 0.244 ± 0.017 | 1.88 ± 0.17 | 0.149 ± 0.040 |
| 5 | 0.307 ± 0.056 | 3.48 ± 0.56 | 0.137 ± 0.018 |
| 6 | 0.439 ± 0.073 | 9.08 ± 0.85 | 0.102 ± 0.032 |
| 8 | 0.651 ± 0.042 | 15.86 ± 2.15 | 0.0734 ± 0.018 |
| 10 | 0.843 ± 0.077 | 16.64 ± 1.30 | 0.051 ± 0.017 |
| 12 | 1.123 ± 0.096 | 23.99 ± 5.81 | 0.033 ± 0.003 |
| 16 | 1.575 ± 0.114 | 32.21 ± 6.25 | 0.028 ± 0.005 |

(Table I), and Free Endpoint Velocity takes an average of 0.11 s for 2 drones (Table II). Moreover, when applied online, we solve the optimization in a shrinking horizon fashion, drastically reducing runtimes in later iterations.

C. Multi Drone Multi Mission Example

Our method can be applied to scenarios with multiple missions We illustrate this with the following 2-mission scenario:—Mission Pkg: A package delivery mission. The drone(s) d must visit a Delivery region to deliver a package within the first 10 seconds and then visit the Base region to pick up another package, which becomes available between 10 and 20 seconds later. In STL, $$\varphi_{pkg}{}^d = \Diamond_{[0,10]}(p^d \in \text{Deliver}) \wedge \Diamond_{(10,20]}(p^d \in \text{Base}) \quad (15)$$

Mission Srv: A surveillance mission. The drone(s) d must, within 20 seconds, monitor two regions sequentially. In STL, $$\varphi_{srv}{}^d = \Diamond_{[0,5]}(p^d \in \text{Zone}_1) \wedge \Diamond_{(5,10]}(p^d \in \text{Zone}_2) \\ \wedge \Diamond_{[10,15]}(p^d \in \text{Zone}_1) \wedge \Diamond_{(15,20]}(p^d \in \text{Zone}_2) \quad (16)$$

In addition to these requirements, all the drones must always maintain a minimum separation of $\delta_{min}$ from each other ($\varphi_{sep}{}^{d,d'}$ above) and avoid two unsafe sets Unsafe$_1$ and Unsafe$_2$. Given an even number D of drones, the odd-numbered drones are flying mission Pkg, while the even-numbered drones are flying mission Srv. The overall mission specification over all D drones is:

$$\varphi_{x\text{-mission}} = \bigwedge_d {}_{Odd}\varphi_{pkg}{}^d \wedge \bigwedge_d {}_{Even}\varphi_{srv}{}^d \wedge \bigwedge_{d \leq D} \bigwedge_{d' \neq d} \varphi_{sep}{}^{d,d'} \wedge \bigwedge_{d \leq D} \bigwedge_{i=1}^{2} \square_{[0,20]} \neg (p^d \in \text{Unsafe}_i)$$

Figure 6:
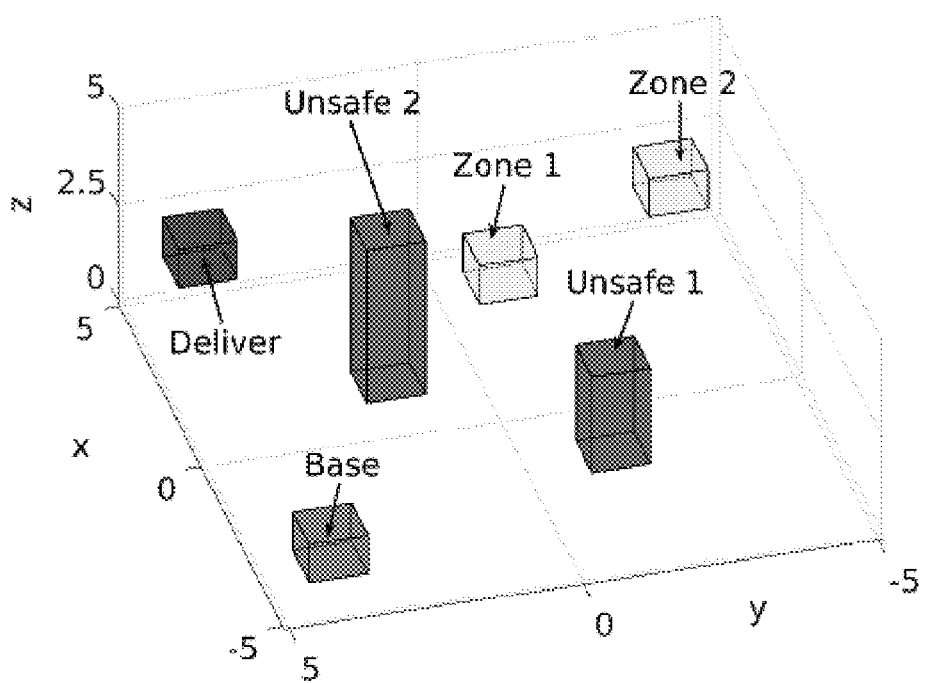
FIG. 6 shows an example environment for the multi-mission problem.

The mission environment is shown in FIG. 6. Note that the upper bound on robustness is again 0:25.

TABLE III

Mean ± standard deviation for runtimes (in seconds) and robustness values for one-shot optimization. Obtained from 50 runs of the multi-mission problem with random initial positions.

| D | Boolean mode | Robust mode | ρ* (Robust mode) |
|---|---|---|---|
| 2 | 0.33 ± 0.083 | 4.93 ± 0.18 | 0.2414 ± 0 |
| 4 | 0.65 ± 0.10 | 16.11 ± 4.05 | 0.2158 ± 0.0658 |
| 6 | 2.38 ± 0.28 | 24.83 ± 7.50 | 0.1531 ± 0.0497 |
| 8 | 20.82 ± 4.23 | 32.87 ± 2.26 | 0.0845 ± 0.0025 |

Results. We solved this problem for D=2, 4, 6, 8 drones, again with randomly generated initial positions in both Robust and Boolean modes. Videos of the resulting trajectories are in links 7-10 of Table V. The runtimes increase with the number of drones, as shown in Table III. The runtimes are very suitable for offline computation. For online computation in a shrinking horizon fashion, they impose an update rate of at most ½ Hz (once every 2 seconds). In general, in the case of longer horizons, this method can serve as a one-shot planner.

For D>8, the optimization could not return a solution that satisfied the STL specification. This is likely due to the small size of the sets that must be visited by all drones in the same time interval, which is difficult to do while maintaining minimum separation (see FIG. 6). So, it is likely the case that no solution exists, which is corroborated by the fact that maximum robustness decreases as D increases (Table III).

VII. EXPERIMENTS ON REAL QUADROTORS

Figure 2:
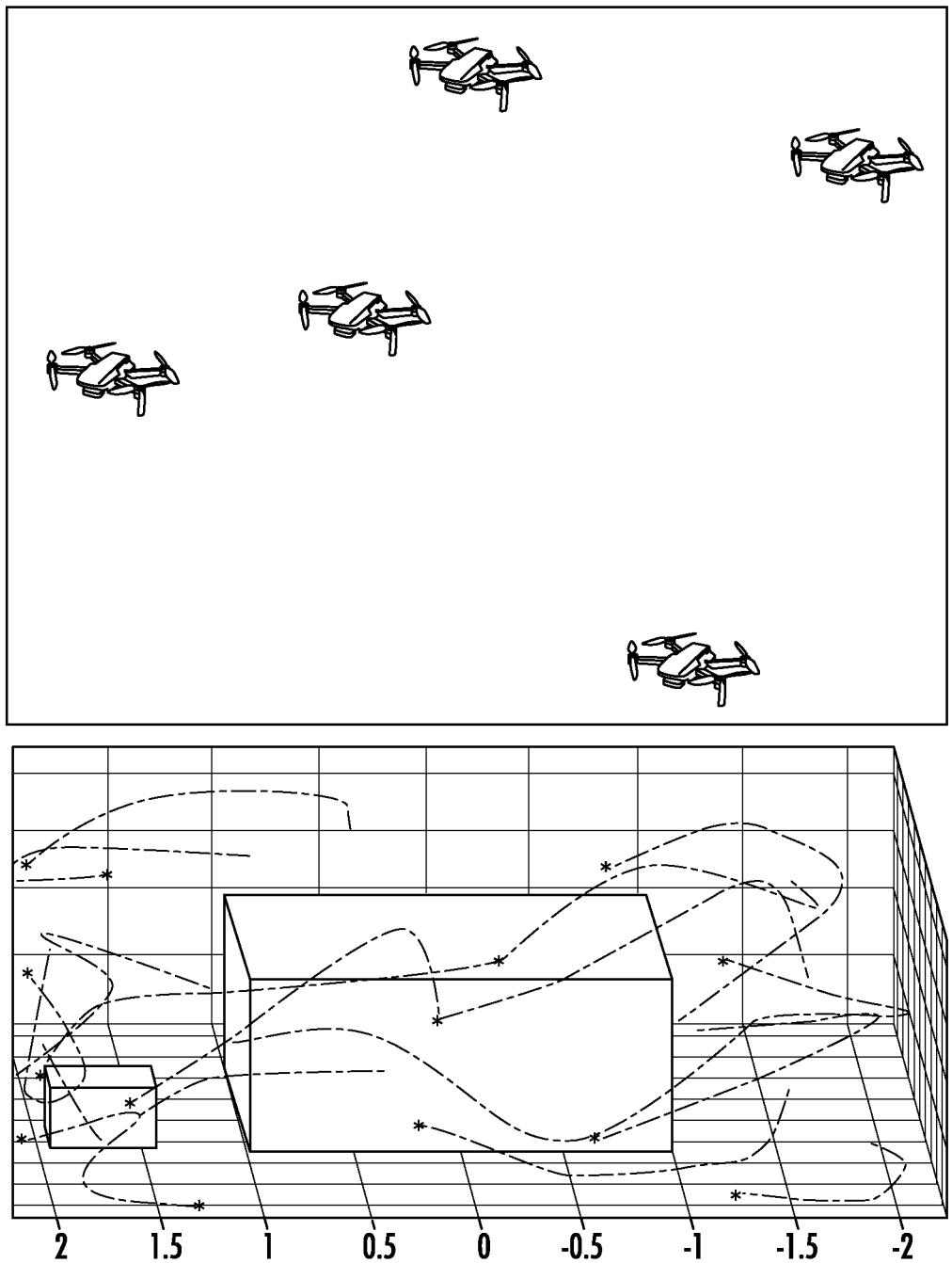
FIG. 2 shows (top) Five Crazyflie 2.0 quadrotors executing a reach-avoid mission and (bottom) a screenshot of a simulation with 16 quadrotors.

We evaluate our method on Crazyflie 2.0 quadrotors (FIG. 2). Through these experiments we aim to show that: a) the velocity and acceleration constraints from Section IV-B indeed ensure that the high-rate trajectory y generated by robustness maximization is dynamically feasible and can be tracked by the MPC position controller, and b) our approach can control the quadrotors to satisfy their specifications in a real-time closed loop manner.

A. Experimental Setup

The Crazyflies are controlled by a single laptop running ROS and MATLAB. For state estimation, a Vicon motion capture system gave us quadrotor positions, velocities, orientations and angular velocities. In order to control the Crazyflies, we: a) implemented the robustness maximization using Casadi in MATLAB, and interfaced it to ROS using the MATLABROS interface provided by the Robotics Toolbox, b) implemented a Model Predictive Controller (MPC) using the quadrotor dynamics linearized around hover for the position controller, coded in C using CVXGEN and ROS, c) modified the ETH tracker in C++ to work with ROS. The Crazyflie has its own attitude controller flashed to the onboard microcontroller. The robustness maximizer runs at 1 Hz, the trajectory generator runs at 20 Hz, the position controller runs at 20 Hz and the attitude controller runs at 50 Hz.

B. Online Real-Time Control

We fly the reach-avoid problem (in both Stop-and-Go and Free Endpoint Velocity modes), for one and two drones, with T=6 seconds, and with a maneuver duration $T_f$ set to 1 second. The controller operates in Boolean mode.

The shrinking horizon approach of Section V is used with a re-calculation rate of 1 Hz. This approach can be implemented in an online manner in real-time when the computation time for the high-level optimization (12) is much smaller than the re-calculation rate of the optimization, as it is in the cases we consider here.

We repeat each experiment multiple times. For every run, the quadrotors satisfied the STL specification of (14). The runtimes are shown in Table IV. Using the optimal solution at the previous time step as the initial solution for the current time step results in very small average runtimes per time-step. This shows that our method can be easily applied in a real-time closed-loop manner.

TABLE IV

Average runtime per time-step (in seconds) of shrinking horizon robustness maximization in Boolean mode. These are averaged over 5 repetitions of the experiment from the same initial point, to demonstrate the reproducibility of the experiments.

| D | Stop-and-Go | Free Endpoint Velocity |
|---|---|---|
| 1 | 0.052 | 0.065 |
| 2 | 0.071 | 0.088 |

We observed that for more than 2 quadrotors, the online delay due to the optimization and the MATLAB-ROS interface (the latter takes up to 10 ms for receiving a state-estimate and publishing a waypoint command) is large enough that the quadrotor has significantly less than $T_f$ time to execute the maneuver between waypoints, resulting in trajectories that sometimes do not reach the goal state.

C. Validating the Dynamic Feasibility of Generated Trajectories.

Figure 7:
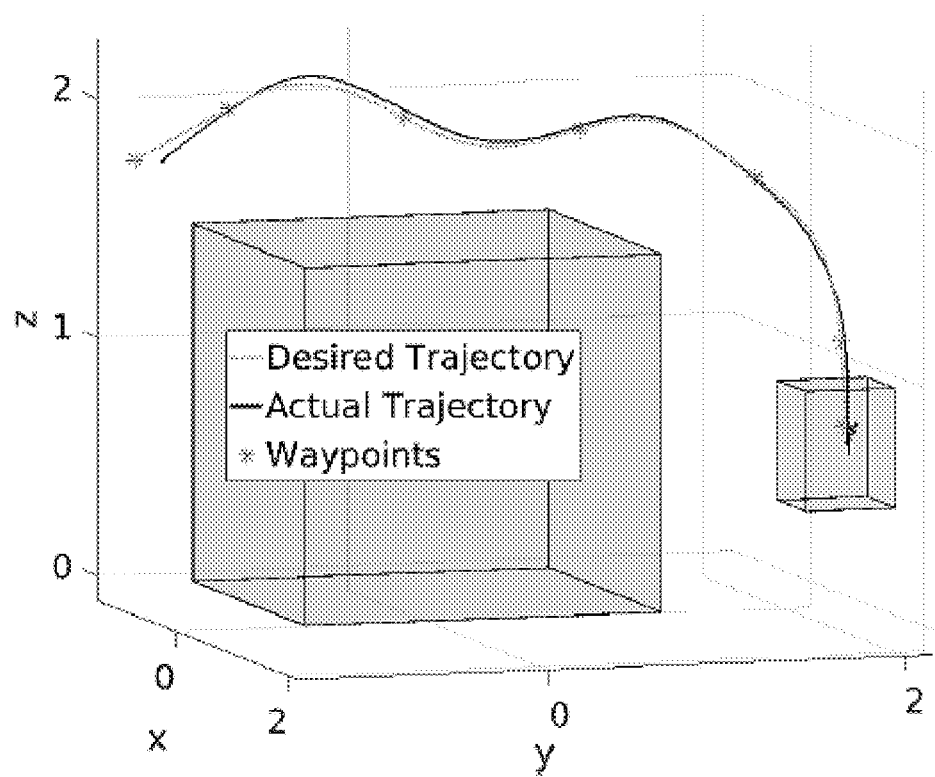
FIG. 7 shows examples of desired and actual trajectories for a UAS flying the reach-avoid problem with closed-loop control.
Figure 8:
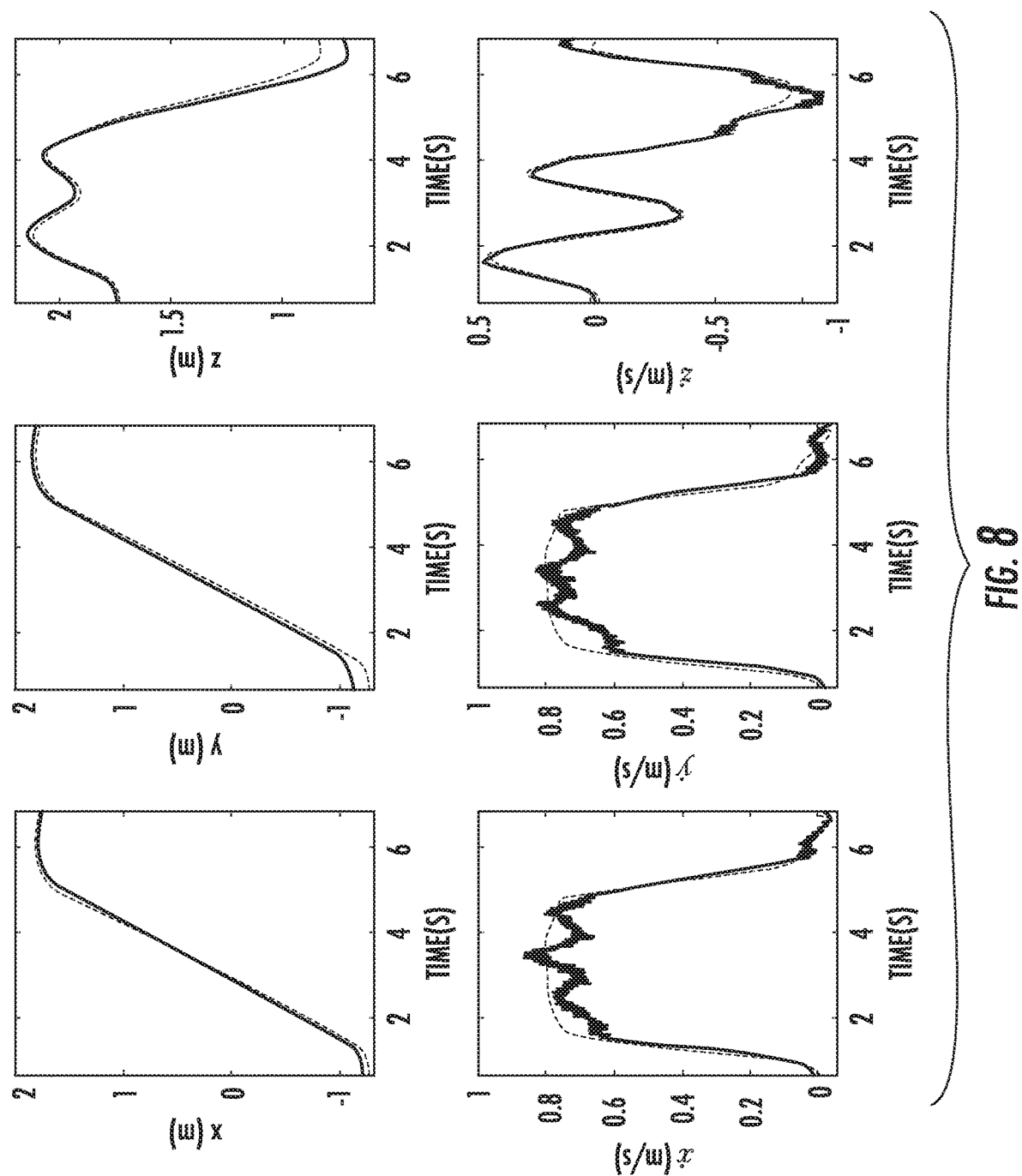
FIG. 8 shows graphs illustrating the desired and actual positions and velocities along the 3 axes.

FIGS. 7 and 8 shows the tracking of the positions and velocities commanded by the spline. The near-perfect tracking shows that we are justified in assuming that imposing velocity and acceleration bounds on the robustness maximizer produces dynamically feasible trajectories that can be tracked by the position and attitude controllers.

D. Offline Planning for Multiple Drones

Our approach can be used as an offline path planner. Specifically, we solve the problem (12) offline for Free Endpoint Velocity motion and use the solution low-rate trajectory x as waypoints. Online, we run the trajectory generator of Section IV-A (and lower-level controllers) to navigate the Crazyflies between the waypoints in a shrinking horizon fashion. We did this for all 8 Crazyflies at our disposal, and we expect it is possible to support significantly more Crazyflies, since the online computation (for the individual position and attitude controllers of the drones) is completely independent for the various drones.

Fly-by-Logic: A Tool for Unmanned Aircraft System Fleet Planning Using Temporal Logic Safe planning for fleets of Unmanned Aircraft Systems (UAS) performing complex missions in urban environments has typically been a challenging problem. In the United States of America, the National Aeronautics and Space Administration (NASA) and the Federal Aviation Administration (FAA) have been studying the regulation of the airspace when multiple such fleets of autonomous UAS share the same airspace, outlined in the Concept of Operations document (ConOps). While the focus is on the infrastructure and management of the airspace, the Unmanned Aircraft System (UAS) Tra_c Management (UTM) ConOps also outline a potential airspace reservation based system for operation where operators reserve a volume of the airspace for a given time interval to operate in, but it makes clear that the safety (separation from other aircraft, terrain, and other hazards) is a responsibility of the drone fleet operators. In the following section, we present a tool that allows an operator to plan out missions for fleets of multi-rotor UAS, performing complex timebound missions. The tool builds upon a correct-by-construction planning method by translating missions to Signal Temporal Logic (STL). Along with a simple user interface, it also has fast and scalable mission planning abilities. We demonstrate our tool for one such mission.

Figure 9:
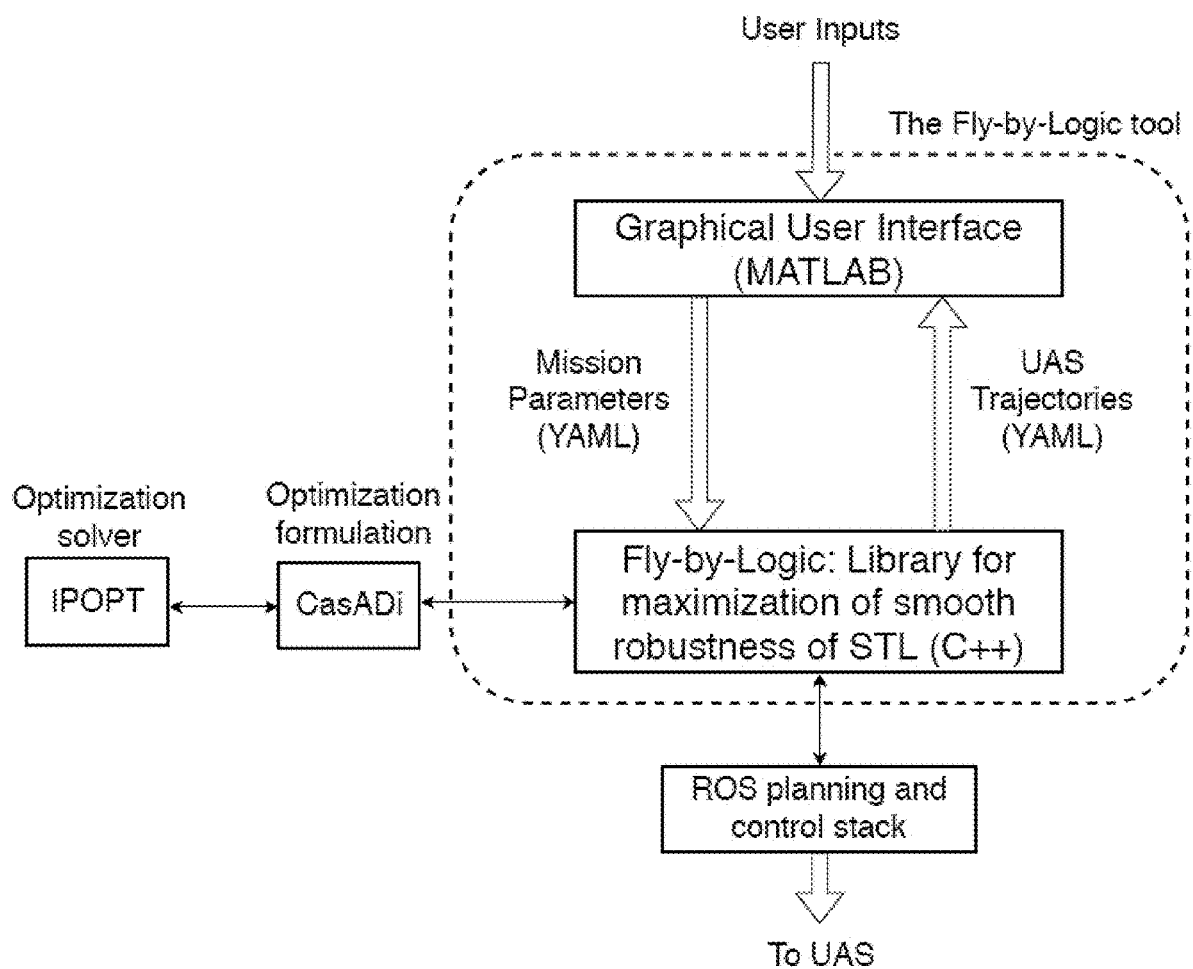
FIG. 9 is a block diagram of a fly-by-logic tool-chain.

FIG. 9 shows the architecture of the Fly-by-Logic tool. Through the user interface in MATLAB, the user defines the missions. The mission specific spatial and temporal parameters are then read in by the Fly-by-Logic C++ back-end. Here, these parameters are used to generate a function for the continuously differentially approximation of the robustness of the STL specification associated with the mission. An optimization to maximize this function value is then formulated in Casadi. Solving this optimization via IPOPT results in a sequence of way-points for every UAS (uniformly apart in time). Also taken into account in the formulation is the motion to connect these way-points, which is via jerk-minimizing splines and results in trajectories for each UAS. Through the Fly-by-Logic library, the (original nonsmooth) robustness of these trajectories is evaluated for the mission STL specification and displayed back to the user via the MATLAB interface. A positive value of this robustness implies that the generated trajectories satisfy the mission and can be own out, while a negative value (or 0) implies that the trajectories do not satisfy the mission and either some additional parameters need to be tweaked (e.g. allowable velocity and acceleration bounds for the UAS, time intervals to visit regions, or a constant for the smooth robustness computation) or that the solver is incapable of solving this particular mission from the given initial positions of the UAS.

Through the interface, the user starts by defining the number of way-points N (same number for each drone), as well as the (fixed) time, T that the UAS take to travel from one way-point to the next. These way-points are the variables that the tool optimizes over, and the overall duration of the mission is then H=NT seconds. Next, the user defines regions in a bounded 3-dimensional workspace (see FIG. 10). These regions are axis-aligned hyper-rectangles and can be either Unsafe no-fly zones, or Goal regions that the UAS can fly to. For each UAS, the user specifies their starting position in the workspace, as well as the velocity and acceleration bounds that their respective trajectories should respect. Finally, the user also specifies the time intervals within which the UAS needs to visit some goal sets.

Through the user interface, the user-defined missions result in specifications corresponding to the following fragment of STL:

$$\varphi = \bigwedge_{u=1}^{U} \bigwedge_{d=1}^{D} (\Box^{I} \neg (p_d \in \text{Unsafe}_u)) \wedge \bigwedge_{d \neq d'} (\Box_I (\|p_d - p_{d'}\|_2 \geq d_{min})) \wedge \bigwedge_{g=1}^{G} \bigwedge_{d=1}^{D} (\Diamond_{I_{g,d}^1} (p_d \in \text{Goal}_g) \wedge \ldots \wedge \Diamond_{I_{g,d}^c} (p_d \in \text{Goal}_g))) \quad (1)$$

Here, D, U, G are the number of UAS, Unsafe sets and Goal sets in the mission respectively. I=[0, NT] is an interval that covers the entire mission duration, while $I_{g,d}^i \subseteq I$, $\forall i=1,\ldots,c$ is the $i^{th}$ interval in which UAS d must visit Goal g. $\neg$ is the boolean negation operator. $p_d$ is the position of UAS d.

The symbol $\Box_I \phi$ corresponds to the Always operator of STL and encodes the requirement that a boolean formula $\phi$ should be true through the time interval I. We use this operator to enforce that the UAS never enter the Unsafe zones or get closer than $d_{min}$ meters of each other. Similarly, $\Diamond_I \phi$ corresponds to the Eventually operator which encodes the requirement that $\phi$ should be true at some point in time in the interval I. We use this to capture the requirement that the a UAS visits a Goal region within the user defined interval I.

Example 1 Two UAS Patrolling Mission

Two UAS, starting off at positions [2, 2, 0] and [−2, −2, 0], are tasked with patrolling two sets, while making sure not to enter the other set, and also maintaining a minimum distance of 0.5 m from each other. For a mission of time 20 s, we set the number of way-points to 20, and the time between them to be 1 s. The timing constraints on the patrolling are as follows: UAS 1 has to visit the first set in an interval of time [0, 5] seconds from the missions starting time, has to visit the other set in the interval [5, 10] seconds, re-visit the first set in the interval [10, 15], and the second set again in the interval [15, 20]. UAS 2 has a similar mission, visiting the first set in the intervals the UAS 1 must visit the second set and so on. FIG. 10 shows the trajectories generated by our method.

For the mission of example 1, the temporal logic specification is:

$$\varphi = \bigwedge_{u=1}^{2} \bigwedge_{d=1}^{2} (\Box_{[0,20]} \neg (p_d \in \text{Unsafe}_u)) \wedge \Box_{[0,20]} (\|p_1 - p_2\|_2 \geq 0.5) \wedge \Diamond_{[0,5]} (p_1 \in \text{Goal}_1) \wedge \Diamond_{[5,10]} (p_1 \in \text{Goal}_2) \wedge \Diamond_{[10,15]} (p_1 \in \text{Goal}_1) \wedge \Diamond_{[15,20]} (p_1 \in \text{Goal}_2) \wedge \Diamond_{[0,5]} (p_2 \in \text{Goal}_2) \wedge \Diamond_{[5,10]} (p_2 \in \text{Goal}_1) \wedge \Diamond_{[10,15]} (p_2 \in \text{Goal}_2) \wedge \Diamond_{[15,20]} (p_2 \in \text{Goal}_1) \wedge \quad (2)$$

The tool comes pre-loaded with some example missions and offers the user the ability to save new missions, as well save and load workspaces as text files. Through the C++ library that forms the back-end for the tool, specifications involving the nested operators $\Box_{I_1} \Diamond_{I_2}$ and $\Diamond_{I_1} \Box_{I_2}$ can be used in conjunction with the template of equation 1.

In order to generate the trajectories that satisfy the mission specification, an optimization is solved (in the C++ back-end) to maximize, over N way-points for each drone, the smooth robustness of the mission STL specification evaluated for the UAS trajectories of NT seconds in duration. The constraints in the optimization ensure that the resulting trajectories are such that the resulting trajectories have velocity and accelerations within the user-defined bounds for each UAS, i.e. are kinematically feasible for the UAS to fly.

Example Method

Figure 11:
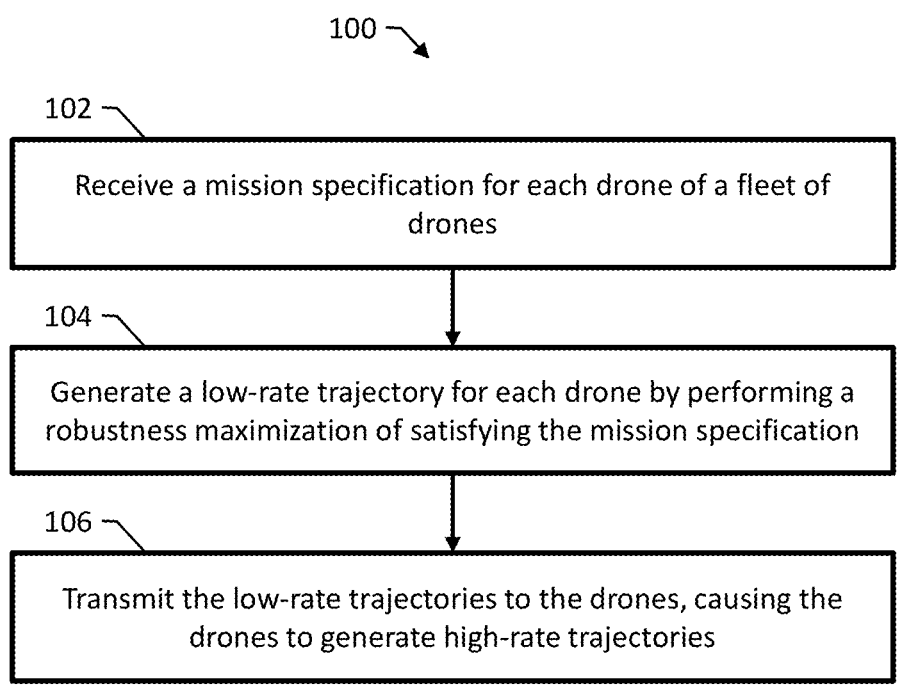
FIG. 11 is a flowchart of an example method for controlling a fleet of drones.

FIG. 11 is a flowchart of an example method 100 for controlling a fleet of drones. Method 100 can be performed, for example, by a central controller implemented on one or more processors. The central controller can be, e.g., a computer server coupled to a wireless transmitter.

In some examples, each of the drones comprises a multi-rotor drone having a local controller. The local controller can be implemented on one or more processors and a wireless receiver. The local controller can include a position controller configured to track positions and velocities and an attitude controller configured to generate force commands for each rotor of the multi-rotor drone.

Method 100 includes receiving a mission specification for each drone of the fleet of drones, each mission specification including a plurality of spatio-temporal requirements for the drone (102). Receiving a mission specification for each drone can include receiving the mission specifications specified using signal temporal logic (STL).

Method 100 includes generating, for each drone, a low-rate trajectory for the drone by performing a robustness maximization of satisfying the mission specification over a low-rate sequence of waypoints for the drone based on a mapping between low-rate trajectories and high-rate trajectories (104). Performing the robustness maximization can include maximizing the robustness of satisfying the mission specification until determining trajectories for the fleet of drones satisfying at least a specified minimum robustness. Performing the robustness maximization can include approximating the robustness of satisfying the mission specification by a smooth function and maximizing the smooth function using gradient-based methods, e.g., Interior Point methods or Sequential Quadratic Programming.

In some examples, generating a low-rate trajectory for the drone comprises including constraints in performing the robustness maximization of satisfying the mission specification such that the high-rate trajectory for the drone is dynamically feasible based on a capability specification of dynamics of the drone. In some examples, generating a low-rate trajectory for the drone comprises including constraints in performing the robustness maximization of satisfying the mission specification to avoid collisions between the drones.

Method 100 includes transmitting, to each drone, the low-rate trajectory for the drone, causing a local controller of each drone to control the drone by generating a high-rate trajectory using the low-rate trajectory and the mapping between low-rate trajectories and high-rate trajectories (106). The mapping between low-rate trajectories and high-rate trajectories can be a function that receives a motion duration, an initial waypoint, and a final waypoint and produces a minimum-jerk trajectory of the motion duration between the initial waypoint and the final waypoint, e.g., using splines.

In some examples, the central controller generates trajectories for a time period in a single shot. In some other examples, generating a low-rate trajectory for the drone comprises repeatedly generating a low-rate trajectory for the drone using an online feedback controller at intervals specified by a shrinking horizon.

In some examples, method 100 can be executed in a distributed manner, without a central controller. For example, method 100 can be executed with each drone solving an optimization on its own and communicating with the other drones.

Although specific examples and features have been described above, these examples and features are not intended to limit the scope of the present disclosure, even where only a single example is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features. In particular, with reference to the appended claims, features from dependent claims may be combined with those of the independent claims and features from respective independent claims may be combined in any appropriate manner and not merely in the specific combinations enumerated in the appended claims.

REFERENCES

The disclosure of each of the following references is hereby incorporated herein by reference in its entirety.

[1] X. Ma, Z. Jiao, and Z. Wang, "Decentralized prioritized motion planning for multiple autonomous uavs in 3d polygonal obstacle environments," in International Conference on Unmanned Aircraft Systems, 2016.

[2] J. P. van den Berg and M. H. Overmars, "Prioritized motion planning for multiple robots," in IEEE/RSJ International Conference on Intelligent Robots and Systems, 2015.

[3] D. Aksaray, A. Jones, Z. Kong, M. Schwager, and C. Belta, "Q-learning for robust satisfaction of signal temporal logic specifications," in IEEE Conference on Decision and Control, 2016.

[4] I. Saha, R. Rattanachai, V. Kumar, G. J. Pappas, and S. A. Seshia, "Automated composition of motion primitives for multi-robot systems from safe ltl specifications," in IEEE/RSJ International Conference on Intelligent Robots and Systems, 2014.

[5] J. A. DeCastro, J. Alonso-Mora, V. Raman, and H. Kress-Gazit, "Collision-free reactive mission and motion planning for multi-robot systems," in Robitics Research, Springer Proceedings in Advanced Robotics, 2017.

[6] A. Desai, I. Saha, Y. Jianqiao, S. Qadeer, and S. A. Seshia, "Drona: A framework for safe distributed mobile robotics," in ACM/IEEE International Conference on Cyber-Physical Systems, 2017.

[7] W. Honig, T. K. Satish Kumar, L. Cohen, H. Ma, H. Xu, N. Ayanian, and S. Koenig, "Multi-agent path finding with kinematic constraints," in International Conference on Automated Planning and Scheduling, 2016.

[8] V. Raman, A. Donze, M. Maasoumy, R. M. Murray, A. Sangiovanni-Vincentelli, and S. A. Seshia, "Model predictive control with signal temporal logic specifications," in 53rd IEEE Conference on Decision and Control, December 2014, pp. 81-87.

[9] S. Sadraddini and C. Belta, "Robust temporal logic model predictive control," in Allerton conference, September 2015.

[10] Y. V. Pant, H. Abbas, and R. Mangharam, "Smooth operator Control using the smooth robustness of temporal logic," in IEEE Conference on Control Technology and Applications, 2017.

[11] H. Abbas, G. E. Fainekos, S. Sankaranarayanan, F. Ivancic, and A. Gupta, "Probabilistic temporal logic falsification of cyber-physical systems," ACM Transactions on Embedded Computing Systems, 2013.

[12] H. Abbas and G. Fainekos, "Computing descent direction of MTL robustness for non-linear systems," in American Control Conference, 2013.

[13] O. Maler and D. Nickovic, Monitoring Temporal Properties of Continuous Signals. Springer Berlin Heidelberg, 2004.

[14] A. Donz´ e and O. Maler, "Robust satisfaction of temporal logic over real-valued signals," in Proceedings of the International Conference on Formal Modeling and Analysis of Timed Systems, 2010.

[15] G. Fainekos and G. Pappas, "Robustness of temporal logic specifications for continuous-time signals," Theoretical Computer Science, 2009.

[16] H. Abbas and G. Fainekos, "Computing descent direction of mti robustness for non-linear systems," in American Control Conference (ACC), 2013, pp. 4411-4416.

[17] T. Luukkonen, "Modelling and control of quadcopter," in Independent research project in applied mathematics. Aalto University School of Science, 2011.

[18] M. W. Mueller, M. Hehn, and R. DAndrea, "A computationally efficient motion primitive for quadrocopter trajectory generation," in IEEE Transactions on Robotics, 2015.

[19] G. Fainekos, "Robustness of temporal logic specifications," Ph.D. dissertation, University of Pennsylvania, 2008. [Online]. Available: http://www.public.asu.edu/_gfaineko/pub/fainekos thesis.pdf

[20] J. Andersson, "A General-Purpose Software Framework for Dynamic Optimization," PhD thesis, Arenberg Doctoral School, KU Leuven, 2013.

[21] A. Wächter and L. T. Biegler, "On the implementation of an interior-point filter line-search algorithm for large-scale nonlinear programming," Mathematical Programming, 2006.

[22] "Hsl. a collection of fortran codes for large scale scientific computation." http://www.hsl.rl.ac.uk, accessed: 2017-10-05.

What is claimed is:

1. A method for controlling a fleet of drones, the method comprising:
receiving, at a controller implemented on one or more processors, a mission specification for each drone of one or more drones, each mission specification including a plurality of spatio-temporal requirements for the drone;
generating, at the controller and for each drone, a first trajectory for the drone by performing a robustness maximization of satisfying the mission specification over a sequence of waypoints for the drone based on a mapping between low-rate trajectories and high-rate trajectories, wherein the mapping between low-rate trajectories and high-rate trajectories is a function that receives a motion duration, an initial waypoint, and a final waypoint; and
transmitting, at the central controller and to each drone, the low-rate trajectory for the drone, causing a local controller of each drone to control the drone by generating a second trajectory using the first trajectory and the mapping between low-rate trajectories and high-rate trajectories, wherein the first trajectory has a lower sampling rate than the second trajectory.

2. The method of claim 1, wherein performing the robustness maximization of satisfying the mission specification comprises maximizing the robustness of satisfying the mission specification until determining trajectories for the fleet of drones satisfying at least a specified minimum robustness.

3. The method of claim 1, wherein performing the robustness maximization of satisfying the mission specification comprises approximating the robustness of satisfying the mission specification by a smooth function.

4. The method of claim 3, wherein performing the robustness maximization of satisfying the mission specification comprises maximizing the smooth function using gradient-based methods.

5. The method of claim 1, wherein the function produces a minimum-jerk trajectory of the motion duration between the initial waypoint and the final waypoint.

6. The method of claim 1, wherein generating a first trajectory for the drone comprises including constraints in performing the robustness maximization of satisfying the mission specification such that the second trajectory for the drone is dynamically feasible based on a capability specification of dynamics of the drone.

7. The method of claim 1, wherein generating a first trajectory for the drone comprises including constraints in performing the robustness maximization of satisfying the mission specification to avoid collisions between the drones.

8. The method of claim 1, wherein receiving a mission specification for each drone comprises receiving the mission specifications specified using signal temporal logic (STL).

9. The method of claim 1, wherein each of the drones comprises a multi-rotor drone and each local controller comprises a position controller configured to track positions and velocities as specified by the second trajectory and an attitude controller configured to generate force commands for each rotor of the multi-rotor drone.

10. The method of claim 1, wherein generating a first trajectory for the drone comprises repeatedly generating a first trajectory for the drone using an online feedback controller at intervals specified by a shrinking horizon.

11. A system for controlling a fleet of drones, the system comprising:
one or more processors; and
a controller implemented on the one or more processors and configured to perform operations comprising:
receiving a mission specification for each drone of one or more drones, each mission specification including a plurality of spatio-temporal requirements for the drone;
generating, for each drone, a first trajectory for the drone by performing a robustness maximization of satisfying the mission specification over a sequence of waypoints for the drone based on a mapping between low-rate trajectories and high-rate trajectories, wherein the mapping between low-rate trajectories and high-rate trajectories is a function that receives a motion duration, an initial waypoint, and a final waypoint; and transmitting, to each drone, the first trajectory for the drone, causing a local controller of each drone to control the drone by generating a second trajectory using the first trajectory and the mapping between low-rate trajectories and high-rate trajectories, wherein the first trajectory has a lower sampling rate than the second trajectory.

12. The system of claim 11, wherein performing the robustness maximization of satisfying the mission specification comprises maximizing the robustness of satisfying the mission specification until determining trajectories for the fleet of drones satisfying at least a specified minimum robustness.

13. The system of claim 11, wherein performing the robustness maximization of satisfying the mission specification comprises approximating the robustness of satisfying the mission specification by a smooth function.

14. The system of claim 13, wherein performing the robustness maximization of satisfying the mission specification comprises maximizing the smooth function using Sequential Quadratic Programming.

15. The system of claim 11, wherein the function produces a minimum-jerk trajectory of the motion duration between the initial waypoint and the final waypoint.

16. The system of claim 11, wherein generating a first trajectory for the drone comprises including constraints in performing the robustness maximization of satisfying the mission specification such that the second trajectory for the drone is dynamically feasible based on a capability specification of dynamics of the drone.

17. The system of claim 11, wherein generating a first trajectory for the drone comprises including constraints in performing the robustness maximization of satisfying the mission specification to avoid collisions between the drones.

18. The system of claim 11, wherein receiving a mission specification for each drone comprises receiving the mission specifications specified using signal temporal logic (STL).

19. The system of claim 11, wherein each of the drones comprises a multi-rotor drone and each local controller comprises a position controller configured to track positions and velocities as specified by the second trajectory and an attitude controller configured to generate force commands for each rotor of the multi-rotor drone.

20. The system of claim 11, wherein generating a first trajectory for the drone comprises repeatedly generating a first trajectory for the drone using an online feedback controller at intervals specified by a shrinking horizon.

21. A non-transitory computer readable medium storing executable instructions that when executed by at least one processor of a computer control the computer to perform operations comprising:
receiving, at a controller implemented on one or more processors, a mission specification for each drone of one or more drones, each mission specification including a plurality of spatio-temporal requirements for the drone;
generating, at the central controller and for each drone, a first trajectory for the drone by performing a robustness maximization of satisfying the mission specification over a sequence of waypoints for the drone based on a mapping between low-rate trajectories and high-rate trajectories, wherein the mapping between low-rate trajectories and high-rate trajectories is a function that receives a motion duration, an initial waypoint, and a final waypoint; and
transmitting, at the central controller and to each drone, the first trajectory for the drone, causing a local controller of each drone to control the drone by generating a second trajectory using the first trajectory and the mapping between low-rate trajectories and high-rate trajectories, wherein the first trajectory has a lower sampling rate than the second trajectory.

* * * * *

UNITED STATES PATENT AND TRADEMARK OFFICE
CERTIFICATE OF CORRECTION

| | |
|---|---|
| PATENT NO. | : 11,429,118 B2 |
| APPLICATION NO. | : 16/515854 |
| DATED | : August 30, 2022 |
| INVENTOR(S) | : Mangharam et al. |

Page 1 of 1

It is certified that error appears in the above-identified patent and that said Letters Patent is hereby corrected as shown below:

In the Specification

Please replace the current paragraph under the heading "GOVERNMENT INTEREST" beginning at Column 1, Line 13, with the following paragraph:
-- This invention was made with government support under 69A3551747111 awarded by the U.S. Department of Transportation. The government has certain rights in the invention. --

Signed and Sealed this
Twenty-seventh Day of February, 2024

Katherine Kelly Vidal
*Director of the United States Patent and Trademark Office*